(12) United States Patent
Lee et al.

(10) Patent No.: US 10,055,395 B2
(45) Date of Patent: Aug. 21, 2018

(54) METHOD FOR EDITING OBJECT WITH MOTION INPUT AND ELECTRONIC DEVICE THEREOF

(71) Applicant: Samsung Electronics Co., Ltd., Gyeonggi-do (KR)

(72) Inventors: Jung-Woo Lee, Gyeonggi-do (KR); Keum-Ju Jang, Seoul (KR); Hyung-Suk Hwang, Gyeonggi-do (KR); Sook-Kyung Choi, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 14/333,379

(22) Filed: Jul. 16, 2014

(65) Prior Publication Data
US 2015/0026569 A1 Jan. 22, 2015

(30) Foreign Application Priority Data

Jul. 16, 2013 (KR) .................. 10-2013-0083357

(51) Int. Cl.
| | |
|---|---|
| *G06F 17/00* | (2006.01) |
| *G06F 17/24* | (2006.01) |
| *G06F 3/01* | (2006.01) |
| *G06F 17/21* | (2006.01) |
| *G06F 1/16* | (2006.01) |

(52) U.S. Cl.
CPC ............ *G06F 17/24* (2013.01); *G06F 1/1686* (2013.01); *G06F 1/1694* (2013.01); *G06F 3/016* (2013.01); *G06F 3/017* (2013.01); *G06F 17/211* (2013.01); *G06F 17/245* (2013.01)

(58) Field of Classification Search
CPC .................................................... G06F 3/0484
See application file for complete search history.

(56) References Cited

U.S. PATENT DOCUMENTS

| | | | |
|---|---|---|---|
| 5,523,775 A | 6/1996 | Capps | |
| 6,112,216 A * | 8/2000 | Pratley | G06F 17/245 715/212 |
| 6,525,749 B1 * | 2/2003 | Moran | G06F 3/04883 345/156 |
| 7,254,787 B2 * | 8/2007 | Jaeger | G06F 3/0481 715/234 |
| 9,201,855 B2 * | 12/2015 | Yalovsky | G06F 17/211 |
| 2006/0253777 A1 | 11/2006 | Yalovsky | |
| 2014/0002377 A1 * | 1/2014 | Brauninger | G06F 3/0482 345/173 |

FOREIGN PATENT DOCUMENTS

EP 0667567 A2 8/1995

OTHER PUBLICATIONS

Ispas et al., "An Extensible Digital Ink Segmentation and Classification Framework for Natural Notetaking," EICS Jun. 2011, Italy, Copyright 2011 ACM, p. 231-240.*
Extended European Search Report dated Mar. 6, 2015 in connection with European Patent Application No. 14175867.2; 7 pages.

* cited by examiner

*Primary Examiner* — Amelia Tapp

(57) ABSTRACT

An electronic device is configured to perform a method for editing an object. The method includes determining one or more edit references with respect to one or more objects displayed on a display unit, detecting a motion input, and editing the one or more objects based on at least one of the one or more edit references and a characteristic of the motion input.

11 Claims, 48 Drawing Sheets

METHOD FOR EDITING OBJECT WITH MOTION INPUT AND ELECTRONIC DEVICE THEREOF

PRIORITY

The present application is related to and claims priority under 35 U.S.C. § 119 to an application filed in the Korean Intellectual Property Office on Jul. 16, 2013 and assigned Serial No. 10-2013-0083357, the contents of which are incorporated herein by reference.

TECHNICAL FIELD

Embodiments of the present disclosure relates generally to methods for editing object and electronic devices thereof.

BACKGROUND

As usage of a multimedia service using a portable electronic device increases, the amount of information to be processed by the portable electronic device and the amount of information to be displayed have increased. As a result, there is a growing interest in a portable electronic device having a touchscreen in which the space thereof is efficiently used and the size of the display unit thereof is increased.

The touchscreen is an input/output device for performing the input and display of information on one screen. Therefore, when the portable electronic device uses the touchscreen, a separate input device, such as a keypad is removed in the portable electronic device, resulting in increment in the display area thereof.

SUMMARY

As described above, the portable electronic device may increase the display area by using the touchscreen, but may include a display unit having the display area smaller than that of a fixed electronic device for portability. Therefore, a user may feel uncomfortable editing an object displayed in the display area of the portable electronic device due to a limitation in display area.

To address the above-discussed deficiencies, it is a primary object to provide an apparatus and method for editing an object displayed on a display area in an electronic device.

Embodiments of the present disclosure may provide an apparatus and method for editing an object displayed on a display area based on a characteristic of a motion input in an electronic device.

According to an aspect of the present disclosure, a method for editing an object in an electronic device includes determining one or more edit references with respect to one or more objects displayed on a display unit. The method also includes detecting a motion input. The method further includes editing the one or more objects based on one or more of: the one or more edit references or a characteristic of the motion input.

According to another aspect of the present disclosure, an electronic device includes a display unit, a motion sensor, and a processor. The display unit is configured to display one or more objects. The motion sensor is configured to detect a motion input. The processor is configured to determine one or more edit references with respect to one or more objects displayed on the display unit, and edit the one or more objects displayed on the display unit based on one or more of: a characteristic of a motion input detected through the motion sensor or the one or more edit references.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE DISCLOSURE

Figure 1:
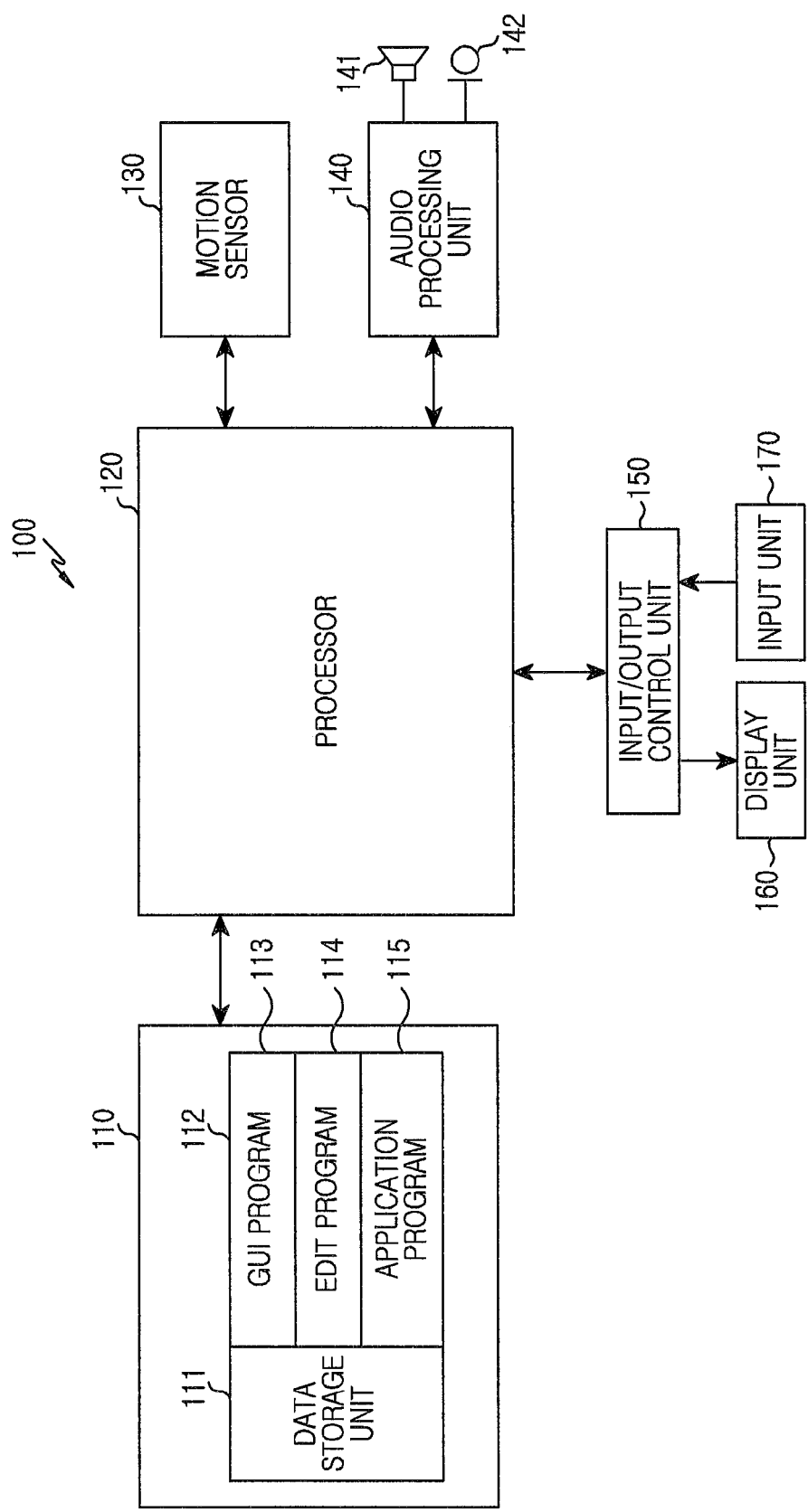
FIG. 1 illustrates a block configuration of an electronic device according to various embodiments of the present disclosure.

FIGS. 1 through 19C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure will be described herein below with reference to the accompanying drawings. Although specific embodiments of the present disclosure are illustrated in the drawings and relevant detailed descriptions are provided, various changes can be made to the exemplary embodiments and various exemplary embodiments may be provided. Accordingly, the various exemplary embodiments of the present disclosure are not limited to the specific embodiments and should be construed as including all changes and/or equivalents or substitutes included in the ideas and technological scopes of the exemplary embodiments of the present disclosure. In the explanation of the drawings, similar reference numerals are used for similar elements.

The term "include" or "may include" used in the exemplary embodiments of the present disclosure indicates the presence of disclosed corresponding functions, operations, elements, etc., and does not limit additional one or more functions, operations, elements, etc. In addition, it should be understood that the term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

The term "or" or "at least one of A or/and B" used in the various exemplary embodiments of the present disclosure includes any and all combinations of the associated listed items. For example, the term "A or B" or "at least one of A or/and B" may include A, B, or all of A and B.

Although the terms such as "first" and "second" used in the various exemplary embodiments of the present disclosure may modify various elements of the various exemplary embodiments, these terms do not limit the corresponding elements. For example, these terms do not limit an order and/or importance of the corresponding elements. These terms may be used for the purpose of distinguishing one element from another element. For example, a first user device and a second user device all indicate user devices or may indicate different user devices. For example, a first element may be named as a second element without departing from the right scope of the various exemplary embodiments of the present disclosure, and similarly, a second element may be named as a first element.

It will be understood that when an element is "connected" or "coupled" to another element, the element may be directly connected or coupled to the other element, and there may be another new element between the element and the another element. To the contrary, it will be understood that when an element is "directly connected" or "directly coupled" to another element, there is no other element between the element and the another element.

The terms used in the various exemplary embodiments of the present disclosure are for the purpose of describing particular exemplary embodiments only and are not intended to be limiting. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various embodiments of the present disclosure may be a device which is equipped with a display function. For example, the electronic device may include at least one of a smartphone, a tablet PC, a mobile phone, a video phone, an electronic book reader, a desktop PC, a laptop PC, a net book computer, a Personal Digital Assistant (PDA), a Portable Multimedia Player (PMP), an MP3 player, a mobile medical machine, a camera, and a wearable device (for example, a Head-Mounted-Device (HMD) such as electronic glasses, electronic clothing, an electronic bracelet, an electronic necklace, an electronic accessory, an electronic tattoo, or a smart watch).

According to an embodiment, the electronic device may be a smart home appliance which is equipped with a display function. For example, the smart home appliance may include at least one of a television, a digital versatile disk (DVD) player, a stereo, a refrigerator, an air conditioner, a cleaner, an oven, a microwave oven, a washing machine, an air cleaner, a set-top box, a TV box (for example, SAMSUNG HOMESYNC, APPLE TV, or GOOGLE TV), a game console, an electronic dictionary, an electronic key, a camcorder, and an electronic album.

According to an embodiment, the electronic device may include at least one of various medical machines (for example, magnetic resonance angiography (MRA), magnetic resonance imaging (MRI), computerized tomography (CT), a tomograph, an ultrasound machine, etc.), a navigation device, a global positioning system (GPS) receiver, an event data recorder (EDR), a flight data recorder (FDR), an automotive infotainment device, an electronic equipment for ship (for example, a navigation equipment for ship, a gyro compass, etc.), an airline electronic device, a security device, a head unit for a car, an industrial or home service robot, an automated teller machine (ATM) of a financial institution, and a point-of-sale (POS) of a store, which are equipped with a display function.

According to an embodiment, the electronic device may include at least one of a part of furniture or a building or structure equipped with a display function, an electronic board, an electronic signature input device, a projector, and various measurement devices (for example, water, power, gas, radio waves, etc.). The electronic device according to various embodiments of the present disclosure may be one or a combination of one or more of the above-mentioned devices. In addition, the electronic device according to various embodiments of the present disclosure may be a flexible device. In addition, it is obvious to an ordinary skilled person in the related art that the electronic device according to various embodiments of the present disclosure is not limited to the above-mentioned devices.

Embodiments of the present disclosure may provide an apparatus and method for editing an object in an electronic device. The object is information displayed on the electronic device and may include one or more of text, such as a section, a paragraph, or a sentence, each of which may be discriminated from each other, a table, and an image.

FIG. 1 illustrates a block configuration of an electronic device according to various embodiments of the present disclosure.

Referring to FIG. 1, the electronic device 100 may include a memory 110, a processor 120, a motion sensor 130, an audio processing unit 140, an input/output control unit 150, a display unit 160, and an input device 170. At least one of the memory 110 and the processor 120 may be provided in plurality.

The memory 110 may include a data storage unit 111 for storing data generated during the execution of a program and a program storage unit 112 for storing one or more programs for controlling operation of the electronic device 100.

The data storage unit 111 may store edit styles mapped to characteristics of motion inputs detected through the motion sensor 130.

The program storage unit 112 may include a graphic user interface (GUI) program 113, an edit program 114, and at least one application program 115. Herein, the program included in the program storage unit 112 is a set of instructions and may be referred to an instruction set.

The GUI program 113 may include at least one software component for providing a graphic user interface on a display unit 160. The GUI program 113 may display information about application programs executed by the processor 120 on the display unit 160. For example, the GUI program 113 may perform control to change expression of an object on the display unit 160 according to object editing information of the edit program 114.

The edit program 114 may include at least one software component for editing an object displayed on the display unit 160. The edit program 114 may edit one or more objects based on an object edit reference and a characteristic of a motion input provided from the motion sensor 130 according to input information provided from the input unit 170. The object edit reference may include a marking line having a length longer than a reference length for editing of an object.

For example, the edit program 114 may edit text including at least a part of the object edit reference based on the object edit reference according to input information provided from the input 170 and a characteristic of a motion input provided from the motion sensor 130 as described with reference to FIGS. 5A to 5C, 6A to 6C, and 14A to 14C.

As another example, the edit program 114 may edit text including at least a part of the object edit reference based on a plurality of object edit references according to input information provided from the input 170 and a characteristic of a motion input provided from the motion sensor 130 as described with reference to FIGS. 7A to 7C, 8A to 8C, 9A to 9C, 10A to 10C, 11A to 11C, 18A to 18C, and 19A to 19C.

As still another example, the edit program 114 may edit text selected by input information provided from the input unit 170 based on an object edit reference according to the input information provided from the input 170 and a characteristic of a motion input provided from the motion sensor 130 as described with reference to FIGS. 13A to 13C and 15A to 15C.

As still another example, the edit program 114 may edit an area selected by input information provided from the input unit 170 based on an object edit reference according to the input information provided from the input 170 and a characteristic of a motion input provided from the motion sensor 130 as described with reference to FIGS. 16A to 16C.

As still another example, the edit program 114 may edit an image including at least a part of an object edit reference based on the object edit reference according to the input information provided from the input 170 and a characteristic of a motion input provided from the motion sensor 130 as described with reference to FIGS. 17A to 17C.

The edit program 114 may determine an edit style with respect to an object by using one or more of configuration information of an object edit reference and a characteristic of a motion input provided from the motion sensor 130. The configuration information of the object edit reference may include one or more of the number of object edit references and a position of the object edit reference. A characteristic of the motion input may include one or more of a type, a direction, and an intensity of the motion input.

The application program 115 may include a software component for at least one application program installed in the electronic device 100.

The processor 120 may perform control such that the electronic device 100 provides various multimedia services by using at least one program stored in the memory 110. The processor 120 may execute an edit program 114 stored in the program storage unit 112 to edit an object displayed on the display unit 160. The processor 120 may execute the edit program 114 to edit one or more objects based on an object edit reference and a characteristic of a motion input provided from the motion sensor 130 according to input information provided from the input unit 170. For example, the processor 120 may edit text including at least a part of the object edit reference based on the object edit reference according to input information provided from the input 170 and a characteristic of a motion input provided from the motion sensor 130 as described with reference to FIGS. 5A to 5C, 6A to 6C, and 14A to 14C.

As another example, the processor 120 may edit text including at least a part of the object edit reference based on a plurality of object edit references according to input information provided from the input 170 and a characteristic of a motion input provided from the motion sensor 130 as described with reference to FIGS. 7A to 7C, 8A to 8C, 9A to 9C, 10A to 10C, 11A to 11C, 18A to 18C, and 19A to 19C.

As still another example, the processor 120 may edit text selected by input information provided from the input unit 170 based on an object edit reference according to the input information provided from the input 170 and a characteristic of a motion input provided from the motion sensor 130 as described with reference to FIGS. 13A to 13C and 15A to 15C.

As still another example, the processor 120 may edit an area selected by input information provided from the input unit 170 based on an object edit reference according to the input information provided from the input 170 and a characteristic of a motion input provided from the motion sensor 130 as described with reference to FIGS. 16A to 16C.

As still another example, the processor 120 may edit an image including at least a part of an object edit reference based on the object edit reference according to the input information provided from the input 170 and a characteristic of a motion input provided from the motion sensor 130 as described with reference to FIGS. 17A to 17C.

The processor 120 may determine an edit style used to edit an object by using one or more of configuration information of an object edit reference and a characteristic of a motion input provided from the motion sensor 130. The configuration information of the object edit reference may include one or more of the number of object edit references and a position of the object edit reference. A characteristic of the motion input may include one or more of the type, the direction, and the intensity of the motion input.

The motion sensor 130 may recognize a motion input of a user by measuring a physical amount or detecting the operating state of the electronic device. For example, the motion sensor 130 may include one or more cameras, a gesture sensor, a gyro sensor, a magnetic sensor, an accelerometer, a grip sensor, a proximity sensor, a bio sensor, a geomagnetic sensor, or an ultrasonic sensor. The motion sensor 130 may further include a control circuit for controlling one or more sensors included in the motion sensor 130.

The audio processing unit 140 may provide an audio interface between a user and the electronic device 100 through a speaker 141 and a microphone 142.

The input/output control unit 150 may provide an interface between an input/output device, such as the display unit 160 and the input unit 170, and the processor 120.

The display unit 160 displays the state information of the electronic device 100, characters input by the user, moving pictures, and/or still pictures. For example, the display unit 160 may display information associated with application programs executed by the processor 120.

The input unit 170 may provide input data generated by a user's selection to the processor 120 through the input/output control unit 150. For example, the input device 170 may include one or more of a keypad including at least one hardware button and a touch pad for detecting touch information.

Although not illustrated in drawings, the electronic device 100 may further include a communication system for performing at least one communication function among voice communication and data communication. For example, the communication system may support a near-field communication protocol (for example, WiFi, BT, NFC or network communication (for example, Internet, LAN, WAN, telecommunication network, cellular network, satellite network or POTS).

In the above embodiment, the processor 120 may execute software components stored in the program storage unit 112 in one module to edit an object displayed on the display unit 160.

Figure 2:
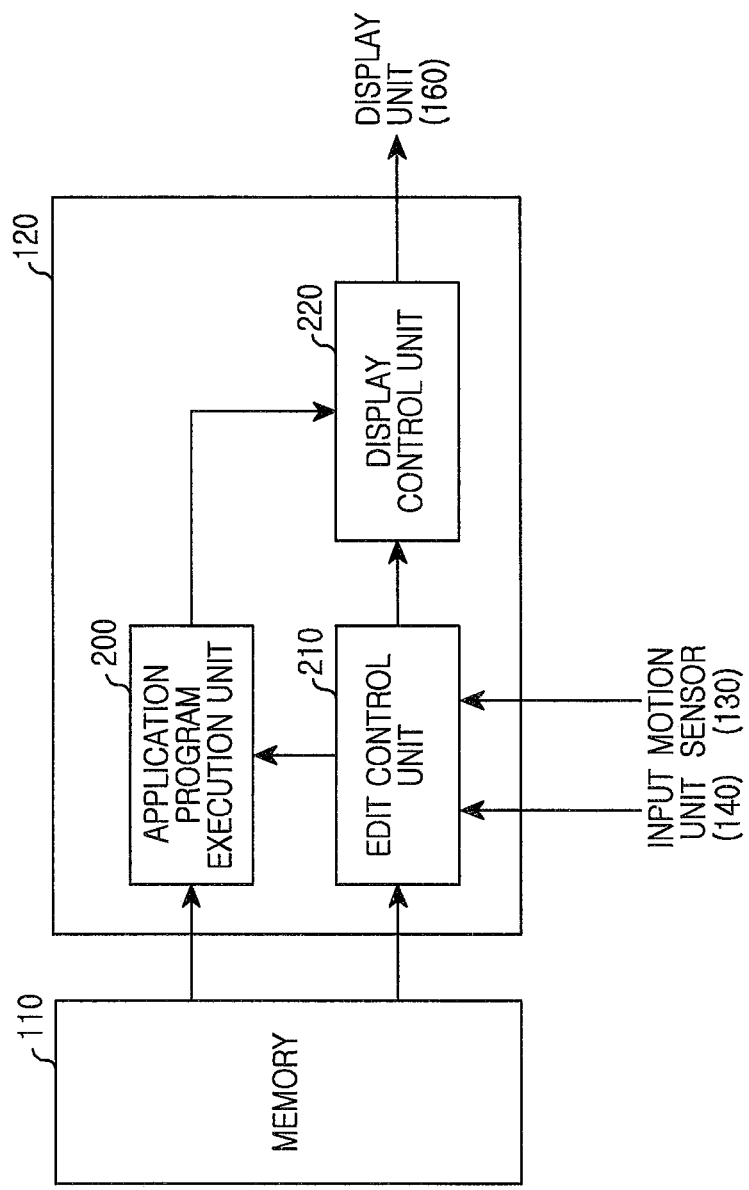
FIG. 2 illustrates a detailed block configuration of a processor according to various embodiments of the present disclosure.

In another embodiment, the processor 120 may include separate modules as the components for editing the object displayed on the display unit 160 as illustrated in FIG. 2.

FIG. 2 illustrates a detailed block configuration of a processor according to various embodiments of the present disclosure.

Referring to FIG. 2, the processor 120 may include an application program execution unit 200, an edit control unit 210, and a display control unit 220.

The application program execution unit 200 executes at least one application program 115 stored in the program storage unit 112 to provide a service corresponding to the program. For example, the application program execution unit 200 may provide a service according to an application program for text input. In another example, the application program execution unit 200 may provide a service according to an application program for image edit.

The edit control unit 210 may edit an object displayed on the display unit 160. For example, the edit control unit 210 may execute an edit program 114 stored in the program storage unit 112 to edit an object displayed on the display unit 160. The edit control unit 210 may edit an object, which is displayed on the display unit 160 for a service according to the application program execution unit 200, based on an object edit reference and a characteristic of a motion input provided from the motion sensor 130 according to input information provided from the input unit 170.

For example, the edit control unit 210 may edit text including at least a part of an object edit reference based on the object edit reference according to input information provided from the input 170 and a characteristic of a motion input provided from the motion sensor 130 as described with reference to FIGS. 5A to 5C, 6A to 6C, and 14A to 14C.

As another example, the edit control unit 210 may edit text including at least a part of an object edit reference based on a plurality of object edit references according to input information provided from the input 170 and a characteristic of a motion input provided from the motion sensor 130 as described with reference to FIGS. 7A to 7C, 8A to 8C, 9A to 9C, 10A to 10C, 11A to 11C, 18A to 18C, and 19A to 19C.

As still another example, the edit control unit 210 may edit text selected by input information provided from the input unit 170 based on an object edit reference according to the input information provided from the input 170 and a characteristic of a motion input provided from the motion sensor 130 as described with reference to FIGS. 13A to 13C and 15A to 15C.

As still another example, the edit control unit 210 may edit an area selected by input information provided from the input unit 170 based on an object edit reference according to the input information provided from the input 170 and a characteristic of a motion input provided from the motion sensor 130 as described with reference to FIGS. 16A to 16C.

As still another example, the edit control unit 210 may edit an image including at least a part of an object edit reference based on the object edit reference according to the input information provided from the input 170 and a characteristic of a motion input provided from the motion sensor 130 as described with reference to FIGS. 17A to 17C.

The edit control unit 210 may determine an edit style with respect to an object by using one or more of configuration information of an object edit reference and a characteristic of a motion input provided from the motion sensor 130. The configuration information of the object edit reference may include one or more of the number of object edit references and a position of the object edit reference. A characteristic of the motion input may include one or more of the type, direction and intensity of the motion input.

The display control unit 220 displays a graphic user interface on the display unit 160. The display control unit 220 may execute a GUI program 113 stored in the program storage unit 112 to provide the graphic user interface on the display unit 160. The display control unit 220 may perform control to display information about an application program executed by the application program execution unit 200 on the display unit 160. For example, the display control unit 220 may perform control to change expression of an object on the display unit 160 according to object edit information by the edit control unit 210.

Figure 3:
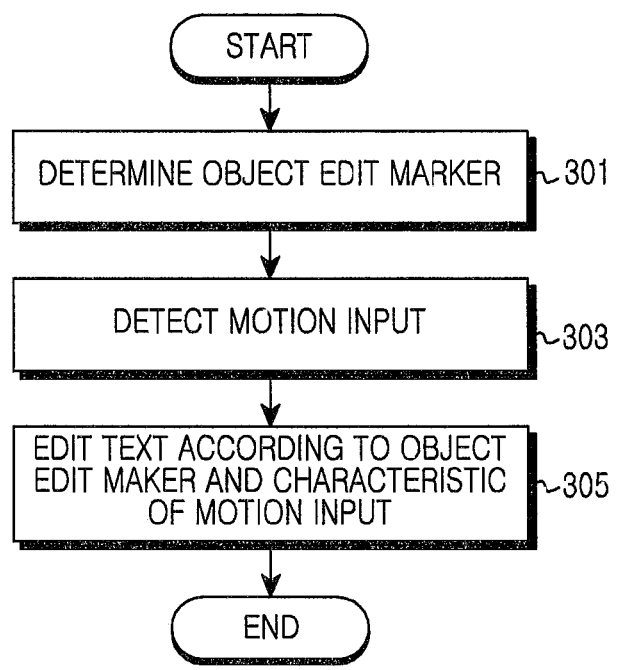
FIG. 3 illustrates a process of editing an object in an electronic device according to various embodiments of the present disclosure.

FIG. 3 illustrates a process of editing an object in an electronic device according to various embodiments of the present disclosure.

Referring to FIG. 3, the electronic device may determine an object edit reference for editing of one or more objects displayed on the display unit 160 in operation 301. For example, the electronic device may determine one or more object edit references based on touch information with respect to the one or more objects displayed on the display unit 160. As another example, the electronic device may determine one or more object edit references based on hovering information with respect to the one or more objects displayed on the display unit 160. The object edit reference may include a marking line having a length longer than a reference length for editing of an object.

The electronic device may detect a motion input in operation 303. For example, when the object edit reference is determined in operation 301, the electronic device may switch its operation mode to an object edit mode. The electronic device may check whether a motion input, such as a gesture of a user or a motion of the electronic device 100, is detected through the motion sensor 130 during the object edit mode. Although not illustrated, the electronic device may terminate the object edit mode when a motion input is not detected for a reference time interval after switching to the object edit mode.

The electronic device may edit the one or more objects based on the object edit reference and a characteristic of the motion input in operation 305. For example, the electronic device may edit the one or more objects including at least a part of the object edit reference based on an edit style mapped to the motion input detected in operation 303 and the object edit reference. As another example, the electronic device may edit the one or more objects selected according to input information provided from the input unit 170 based on an edit style mapped to the motion input detected in operation 303 and the object edit reference.

In the above-described embodiment, the electronic device may determine the object edit reference based on input information detected through the input unit 170. The electronic device may change a position of the object edit reference based on input information detected through the input unit 170.

Figure 4:
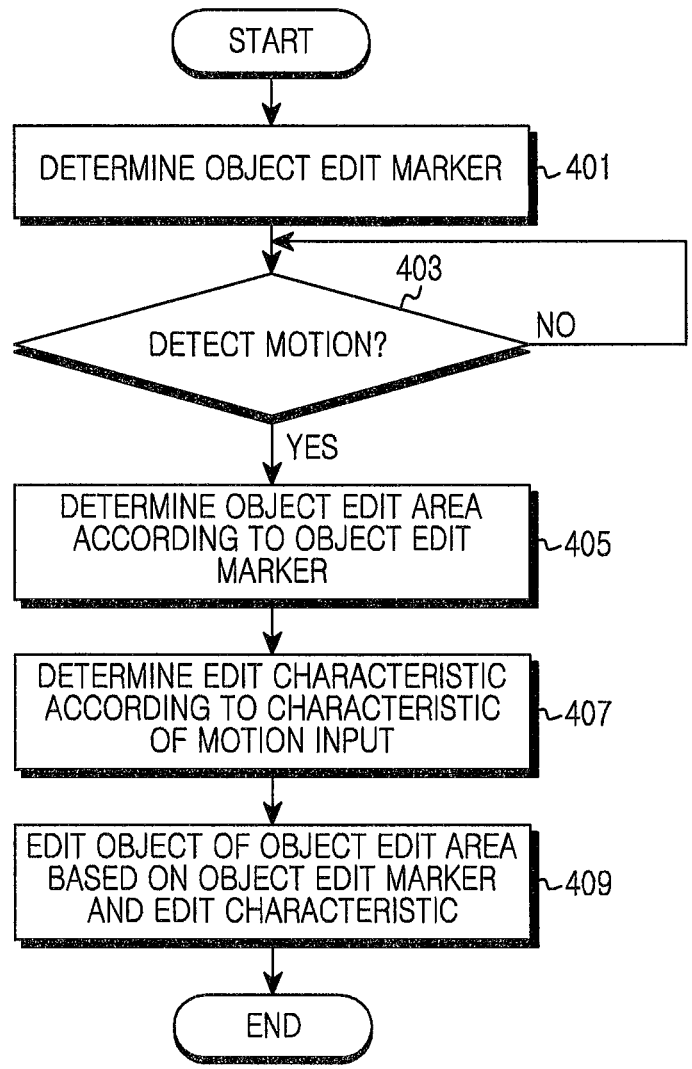
FIG. 4 illustrates a process of editing an object in an electronic device according to various embodiments of the present disclosure.

FIG. 4 illustrates a process of editing an object in an electronic device according to various embodiments of the present disclosure.

Referring to FIG. 4, the electronic device may determine an object edit reference for editing of one or more objects displayed on the display unit 160 in operation 401. For example, the electronic device may determine one or more object edit references based on touch information with respect to the one or more objects displayed on the display unit 160. As another example, the electronic device may determine one or more object edit references based on hovering information with respect to the one or more objects displayed on the display unit 160.

The electronic device may check whether a motion input is detected in operation 403. When the object edit reference is determined in operation 401, the electronic device may switch its operation mode to an object edit mode and check whether a motion input, such as a gesture of a user or a motion of the electronic device 100, is detected through the motion sensor 130.

When a motion input is not detected, the electronic device may check whether a motion input is detected continuously for a reference time interval. Although not illustrated, the electronic device may terminate the object edit mode when a motion input is not detected for a reference time interval after switching to the object edit mode.

When the motion input is detected, the electronic device may determine an object edit area based on the object edit reference in operation 405. For example, the electronic device may determine one or more objects including at least a part of the object edit reference to the object edit area. As another example, the electronic device may determine one or more objects at which a cursor is positioned to the object edit area at the time of setting the object edit reference.

The electronic device may determine an edit style by using one or more of configuration information of an object edit reference and a characteristic of the motion input in operation 407. For example, the electronic device may identify an edit style mapped to the configuration information of the object edit reference and the motion input through the data storage unit 111.

The electronic device may edit the one or more objects included in the object edit area based on the object edit reference and the motion input in operation 409. The electronic device may edit the one or more objects included in the object edit area based on the edit style mapped to the motion input detected in operation 407 and the object edit reference. For example, the electronic device may edit text including at least a part of the object edit reference based on the edit style mapped to the motion input and the object edit reference as described with reference to FIGS. 5A to 5C and 6A to 6C. As another example, the electronic device may edit text in which the object edit reference is set based on the edit style mapped to the motion input and the object edit reference as described with reference to FIGS. 7A to 7C, 8A to 8C, 9A to 9C, 10A to 10C, and 11A to 11C.

In the above-described embodiment, the electronic device may switch to an object edit mode when setting an object edit reference according to input information detected through the input unit 170.

In another embodiment, the electronic device may set an object edit reference according to input information detected through the input unit 170 after switching to an object edit mode according to an object edit event. For example, the electronic device may detect whether the object edit event occurs by using one or more of an object edit icon, an object edit menu, and an object edit gesture.

Figure 5A:
FIGS. 5A to 5C illustrate screen configurations for editing an object based on an object edit reference in an electronic device according to various embodiments of the present disclosure.
Figure 5B:
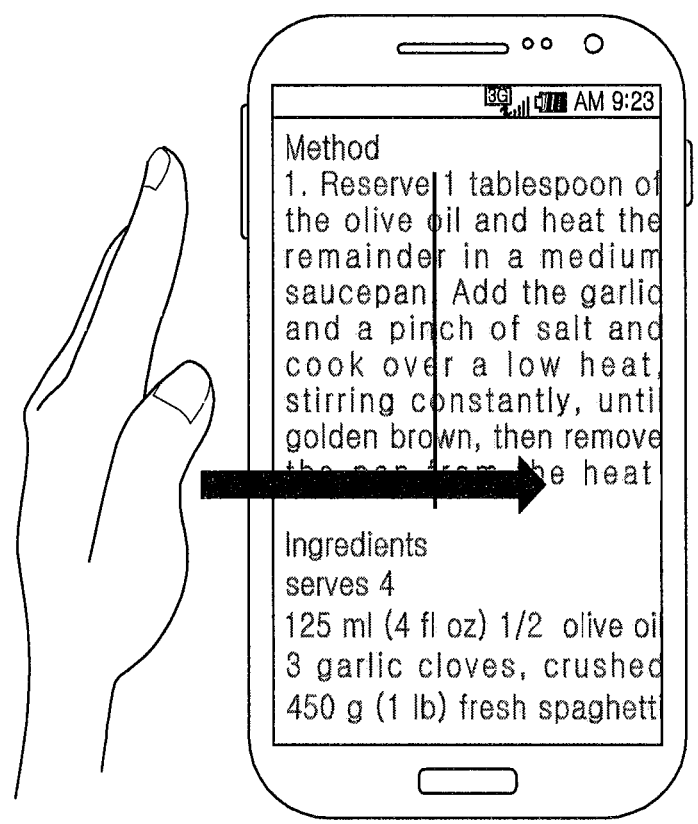
Figure 5C:

FIGS. 5A to 5C illustrate screen configurations for editing an object based on an object edit reference in an electronic device according to various embodiments of the present disclosure.

Referring to FIG. 5A, the electronic device 100 may display text on the display unit 160. The electronic device 100 may set an object edit reference 500 in a portion 502 of text displayed on the display unit 160 based on input information provided from the input unit 170. The electronic device 100 may set the portion 502 of text in which the object edit reference 500 is set to an object edit area.

When a motion input of an air gesture 510 is detected through the motion sensor 130 as illustrated in FIG. 5B, the electronic device 100 may edit text included in the object edit area 502 based on the object edit reference 500 and a characteristic of the air gesture 510. For example, when it is assumed that "first line indentation" is mapped to the single object edit reference 500 and the air gesture 510, the electronic device 100 may perform "first line indentation" on the text included in the object edit area 502 among the text displayed on the display unit 160 based on the object edit reference 500 as illustrated in FIG. 5C (520).

Figure 6A:
FIGS. 6A to 6C illustrate screen configurations for editing text based on an object edit reference in an electronic device according to various embodiments of the present disclosure.
Figure 6B:
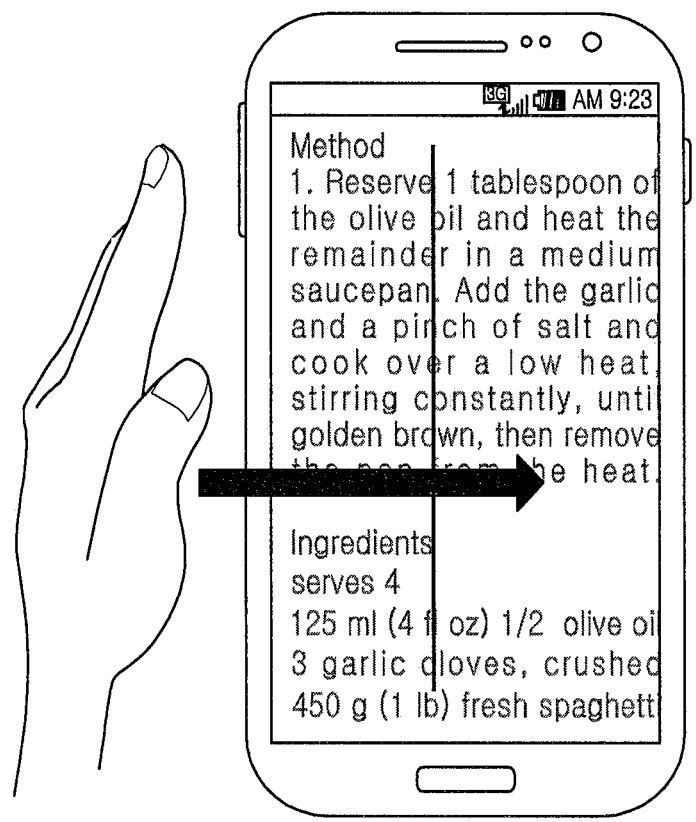
Figure 6C:
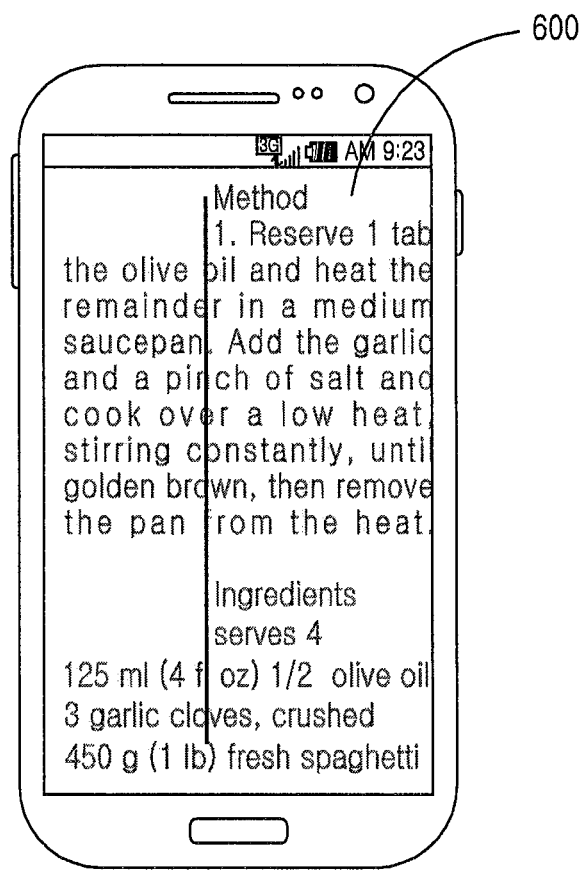

FIGS. 6A to 6C illustrate screen configurations for editing text based on an object edit reference in an electronic device according to various embodiments of the present disclosure.

Referring to FIG. 6A, the electronic device 100 may display text on the display unit 160. The electronic device 100 may set an object edit reference 600 in at least a portion 602 of text displayed on the display unit 160 based on input information provided from the input unit 170. The electronic device 100 may set at least the portion 602 of text in which the object edit reference 600 is set to an object edit area.

When a motion input of an air gesture 610 is detected through the motion sensor 130 as illustrated in FIG. 6B, the electronic device 100 may edit text included in the object edit area 602 based on the object edit reference 600 and the air gesture 610. For example, when it is assumed that "first line indentation" is mapped to the single object edit reference 600 and the air gesture 610, the electronic device 100 may perform "first line indentation" on the text (for example, the text included in the object edit area 602) displayed on the display unit 160 based on the object edit reference 600 as illustrated in FIG. 6C (620).

Figure 7A:
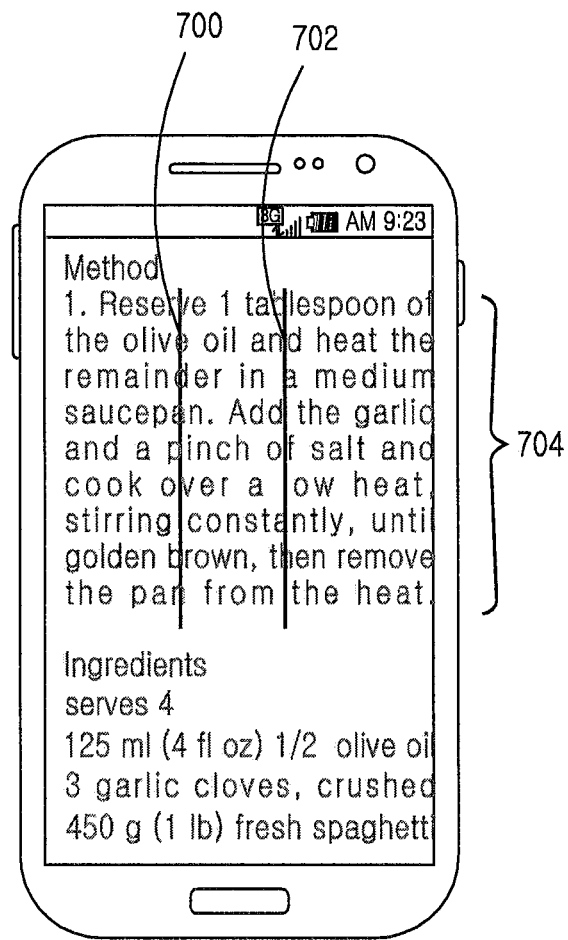
FIGS. 7A to 7C illustrate screen configurations for editing text based on a plurality of object edit references in an electronic device according to various embodiments of the present disclosure.
Figure 7B:
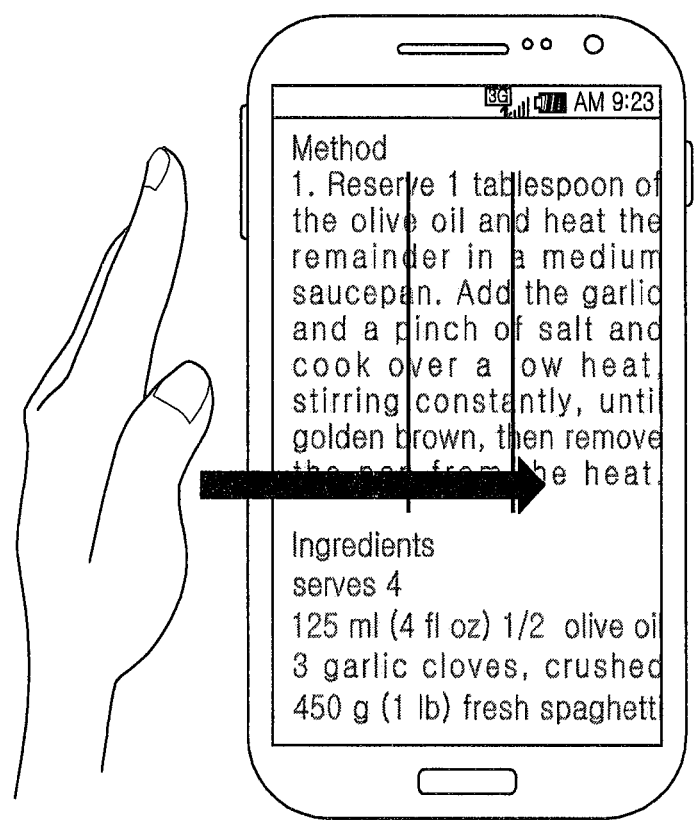
Figure 7C:
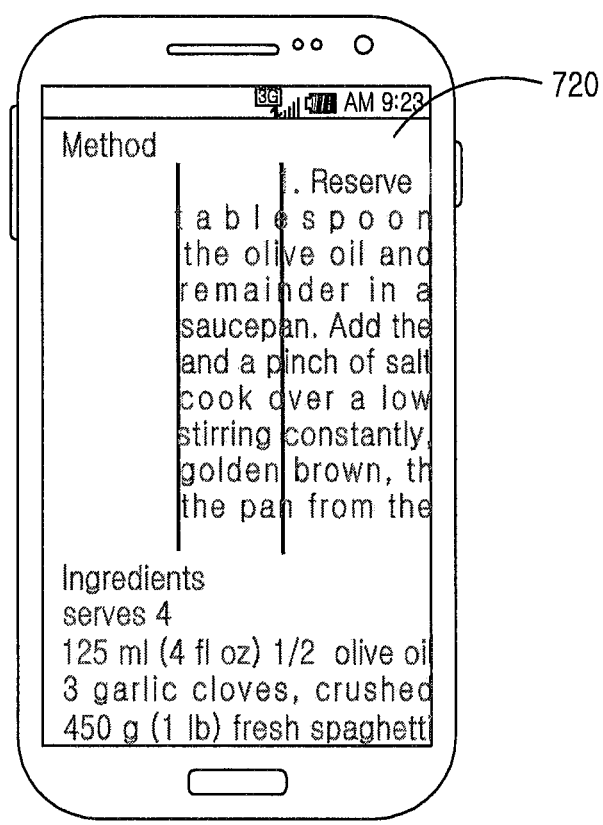

FIGS. 7A to 7C illustrate screen configurations for editing text based on a plurality of object edit references in an electronic device according to various embodiments of the present disclosure.

Referring to FIG. 7A, the electronic device 100 may display text on the display unit 160. The electronic device 100 may set a plurality of object edit references 700 and 702 in a portion 704 of text displayed on the display unit 160, that is, in one object edit area so as not to overlap each other based on input information provided from the input unit 170. The electronic device 100 may set the portion 704 of text in which the object edit references 700 and 702 are set to an object edit area.

When a motion input of an air gesture 710 is detected through the motion sensor 130 as illustrated in FIG. 7B, the electronic device 100 may edit text included in the object edit area 704 based on configuration information of the object edit references 700 and 702 and the air gesture 710. For example, when it is assumed that "left indentation" and "first line indentation" are mapped to the two object edit references 700 and 702, set so as not to overlap each other in one object edit area, and the air gesture 710, the electronic device 100 may perform "left indentation" on text included in the object edit area 704 based on the first object edit reference 700 and perform "first line indentation" on the text of the object edit area 704 on which "hanging indentation" has been performed based on the second object edit reference 702 as illustrated in FIG. 7C (720).

Figure 8A:
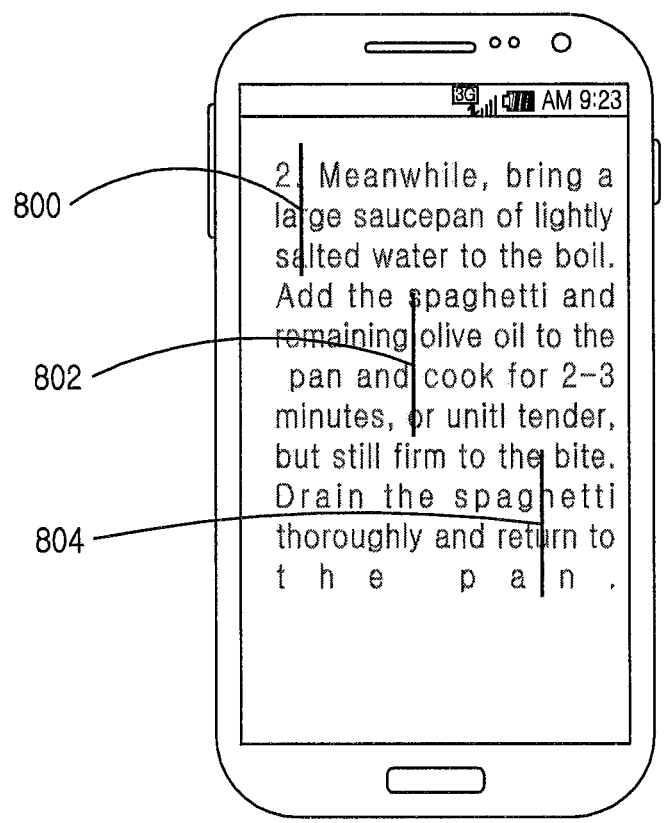
FIGS. 8A to 8C illustrate screen configurations for editing text based on a plurality of object edit references in an electronic device according to various embodiments of the present disclosure.
Figure 8B:
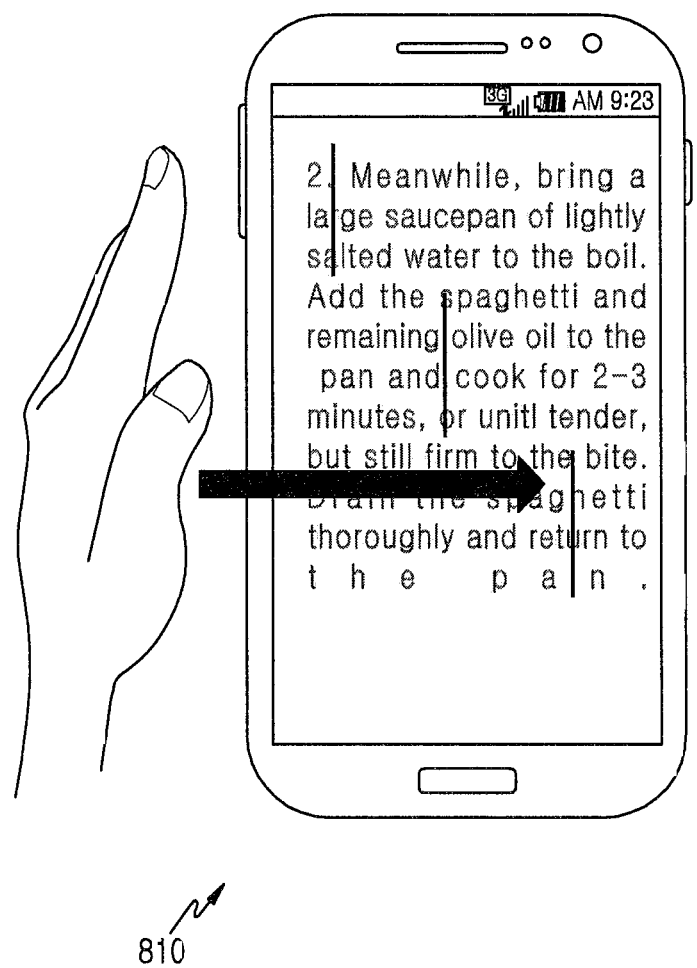
Figure 8C:
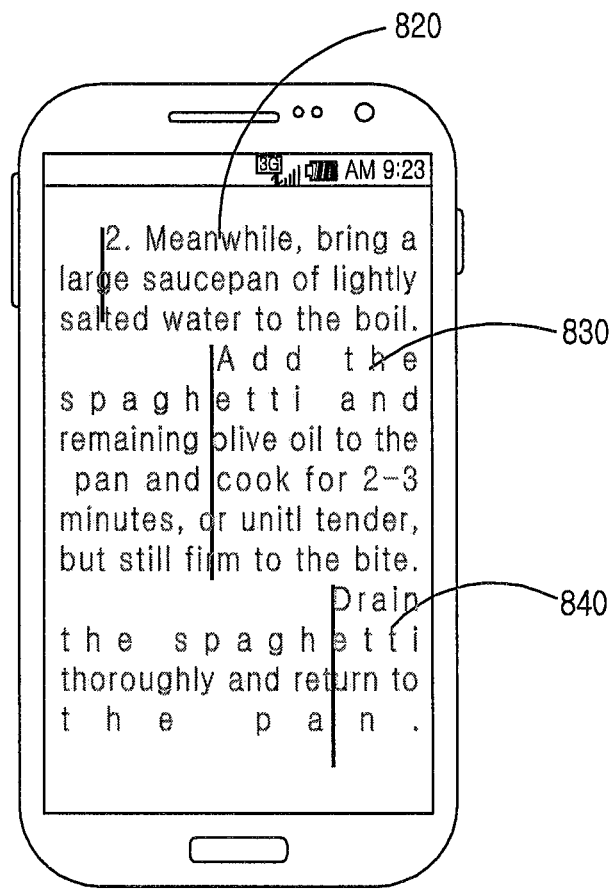

FIGS. 8A to 8C illustrate screen configurations for editing text based on a plurality of object edit references in an electronic device according to various embodiments of the present disclosure.

Referring to FIG. 8A, the electronic device 100 may display text on the display unit 160. The electronic device 100 may set a plurality of object edit references 800, 802 and 804 in different portions of text displayed on the display unit 160 based on input information provided from the input unit 170. The electronic device 100 may set the portions of text, in which the object edit references 800, 802 and 804 are set, to object edit areas.

When a motion input of an air gesture 810 is detected through the motion sensor 130 as illustrated in FIG. 8B, the electronic device 100 may edit text included in the object edit areas in which the respective object edit reference 800, 802 and 804 are set based on configuration information of the object edit references 800, 802 and 804 and the air gesture 810. For example, when the object edit references 800, 802, and 804 are set in the different object edit areas as illustrated in FIG. 8A, the electronic device may recognize that one object edit reference 800, 802 or 804 is set in each of the object edit areas. When it is assumed that "first line indentation" is mapped to the one object edit reference 800, 802 or 804 and the air gesture 810, the electronic device 100 may perform "first line indentation" on text included in the first object edit area 820, in which the first object edit reference 800 is set, based on the first object edit reference 800 as illustrated in FIG. 8C. The electronic device 100 may perform "first line indentation" on text included in the second object edit area 830, in which the second object edit reference 802 is set, based on the second object edit reference 802, and perform "first line indentation" on text included in the third object edit area 840, in which the third object edit reference 804 is set, based on the third object edit reference 804 as illustrated in FIG. 8C.

Figure 9A:
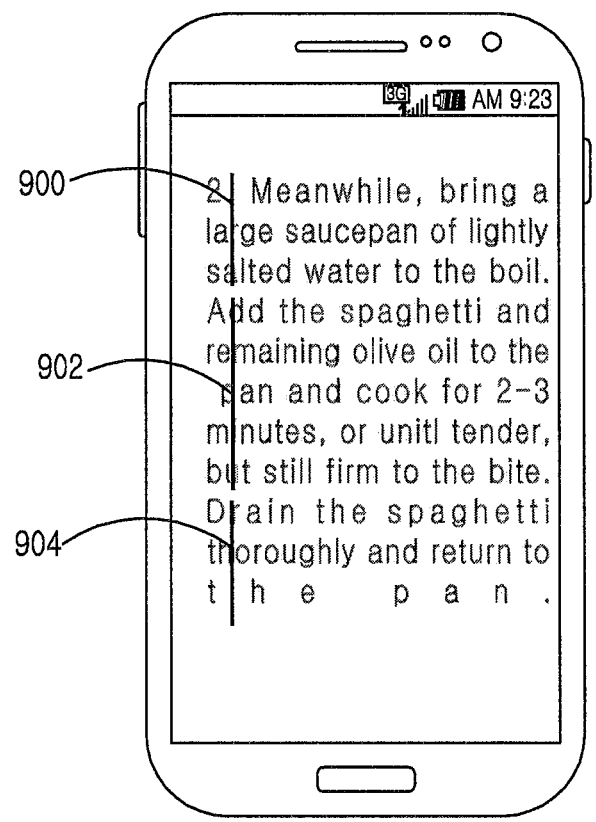
FIGS. 9A to 9C illustrate screen configurations for editing text based on a plurality of object edit references in an electronic device according to various embodiments of the present disclosure.
Figure 9B:
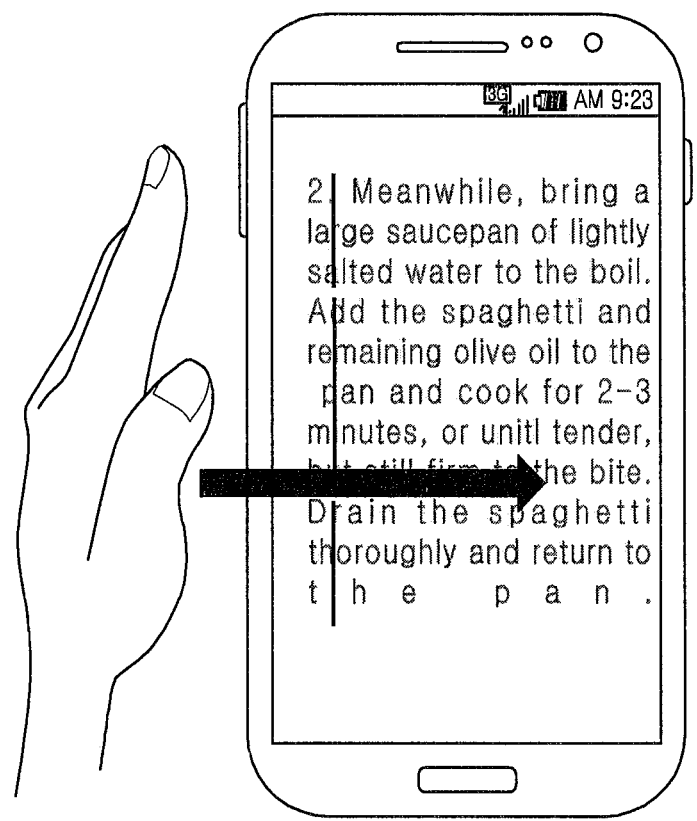
Figure 9C:
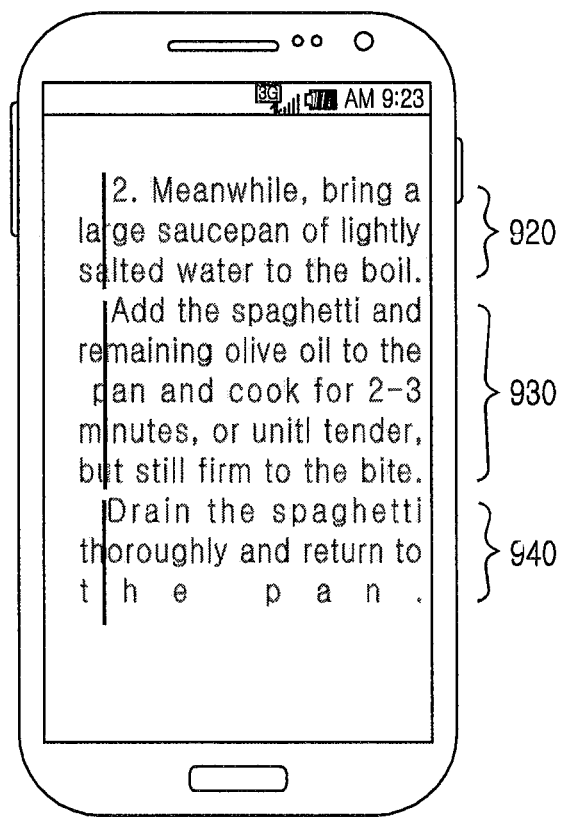

FIGS. 9A to 9C illustrate screen configurations for editing text based on a plurality of object edit references in an electronic device according to various embodiments of the present disclosure.

Referring to FIG. 9A, the electronic device 100 may display text on the display unit 160. The electronic device 100 may set a plurality of object edit references 900, 902 and 904 in different portions of text displayed on the display unit 160 in a row based on input information provided from the input unit 170. The electronic device 100 may set the portions of text, in which the object edit references 900, 902 and 904 are set, to object edit areas.

When a motion input of an air gesture 910 is detected through the motion sensor 130 as illustrated in FIG. 9B, the electronic device 100 may edit text included in the object edit areas in which the respective object edit reference 900, 902 and 904 are set based on configuration information of the object edit references 900, 902 and 904 and the air gesture 910. For example, when the object edit references 900, 902, and 904 are set in the different object edit areas, the electronic device may recognize that one object edit reference 900, 902 or 904 is set in each of the object edit areas. When it is assumed that "first line indentation" is mapped to the one object edit reference 900, 902 or 904 and the air gesture 910, the electronic device 100 may perform "first line indentation" on text included in the first object edit area 920 in which the first object edit reference 900 is set based on the first object edit reference 900 as illustrated in FIG. 9C. The electronic device 100 may perform "first line indentation" on text included in the second object edit area 930, in which the second object edit reference 902 is set, based on the second object edit reference 902, and perform "first line indentation" on text included in the third object edit area 940, in which the third object edit reference 904 is set, based on the third object edit reference 904 as illustrated in FIG. 9C.

In the above embodiment, when object edit references are set in different object edit areas, the electronic device may recognize that one object edit reference is set in each of the object edit areas.

According to another embodiment, when a plurality of object edit areas are set with respect to one or more objects displayed on the display unit 160, the electronic device may apply different edit effects to the object edit areas in which the respective object edit references are respectively set.

Figure 10A:
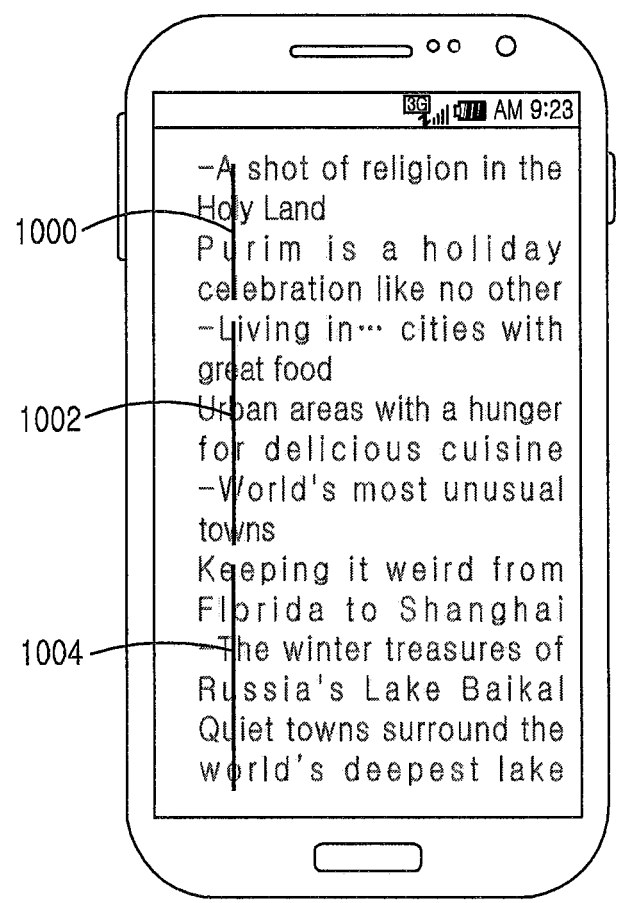
FIGS. 10A to 10C illustrate screen configurations for editing text based on a plurality of object edit references in an electronic device according to various embodiments of the present disclosure.
Figure 10B:
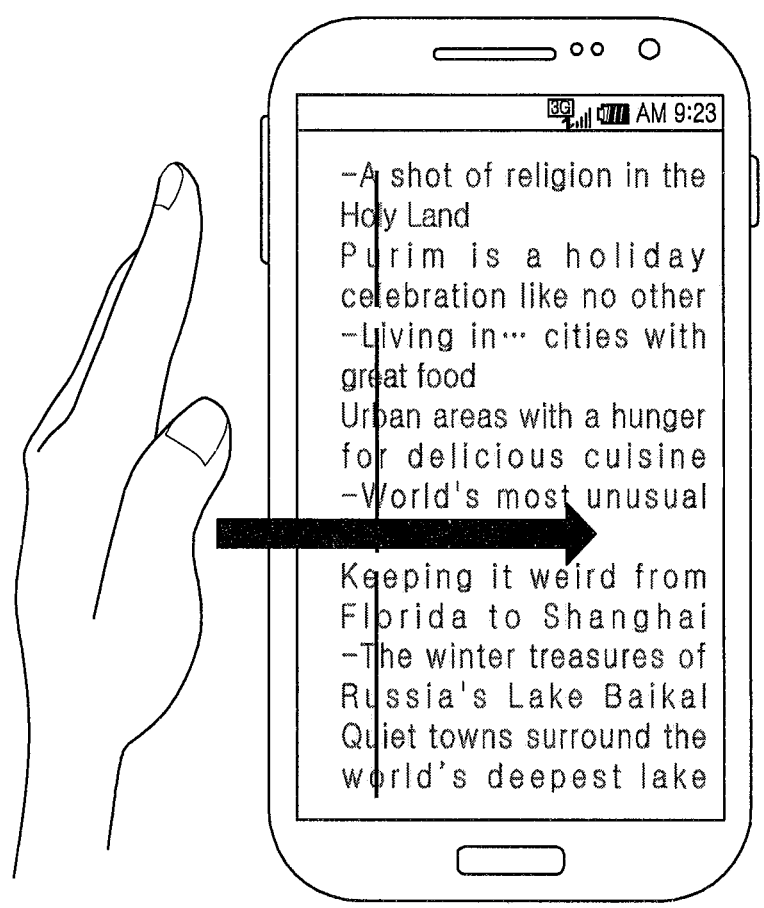
Figure 10C:
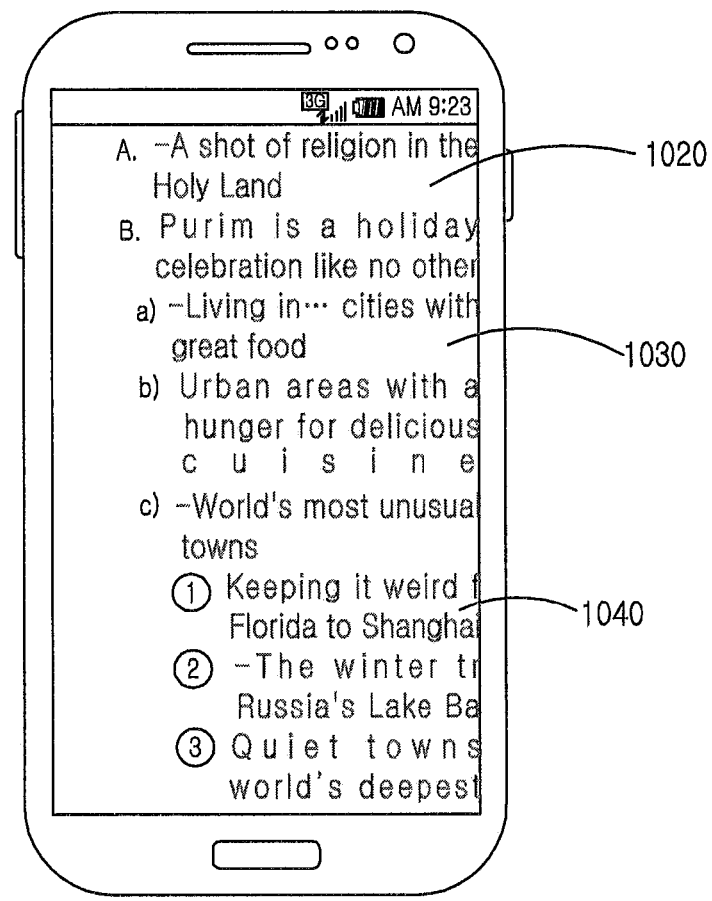

FIGS. 10A to 10C illustrate screen configurations for editing text based on a plurality of object edit references in an electronic device according to various embodiments of the present disclosure.

Referring to FIG. 10A, the electronic device 100 may display text on the display unit 160. The electronic device 100 may set a plurality of object edit references 1000, 1002 and 1004 in different portions of text displayed on the display unit 160 in a row based on input information provided from the input unit 170. The electronic device 100 may set the portions of text, in which the object edit references 1000, 1002 and 1004 are set, to object edit areas.

When a motion input of an air gesture 1010 is detected through the motion sensor 130 as illustrated in FIG. 10B, the electronic device 100 may edit text included in the object edit areas in which the object edit references 1000, 1002 and 1004 are set based on configuration information of the object edit references 1000, 1002 and 1004 and the air gesture 1010. For example, when it is assumed that "left indentation" is mapped to the plurality of object edit references 1000, 1002 and 1004 set in a row and the air gesture 1010, the electronic device 100 may perform "left indentation" on text included in the first object edit area 1020 in which the first object edit reference 1000 is set based on the first object edit reference 1000 as illustrated in FIG. 10C. The electronic device 100 may perform "left indentation" on text included in the second object edit area 1030, in which the second object edit reference 1002 is set, based on the second object edit reference 1002 and a preset first reference interval, and perform "left indentation" on text included in the third object edit area 1040, in which the third object edit reference 1004 is set, based on the third object edit reference 1004 and a preset second reference interval as illustrated in FIG. 10C. In this case, the electronic device 100 may add "bullets and numbering" information to respective sentences according to indentation intervals. The first reference interval may have a different length from the second reference interval.

In the above-described embodiment, the electronic device may again perform "indentation" on the object edit area in which the lower object edit reference is set according to a reference interval, compared to the object edit area in which the higher object edit reference is set.

In the above-described embodiment, the electronic device may again perform "indentation" on the object edit area in which the higher object edit reference is set according to a reference interval, compared to the object edit area in which the lower object edit reference is set.

Figure 11A:
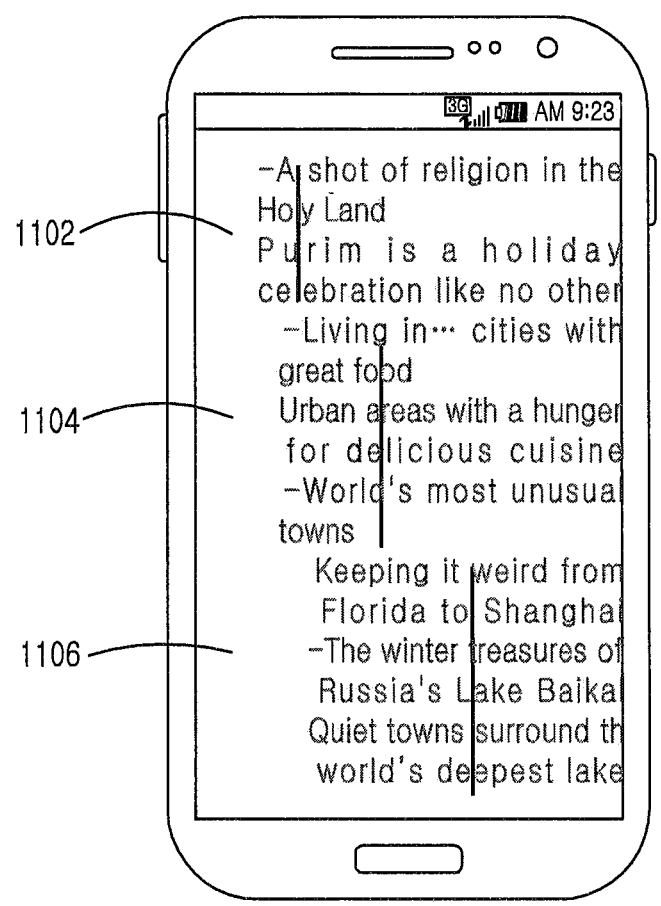
FIGS. 11A to 11C illustrate screen configurations for editing text based on a plurality of object edit references in an electronic device according to various embodiments of the present disclosure.
Figure 11B:
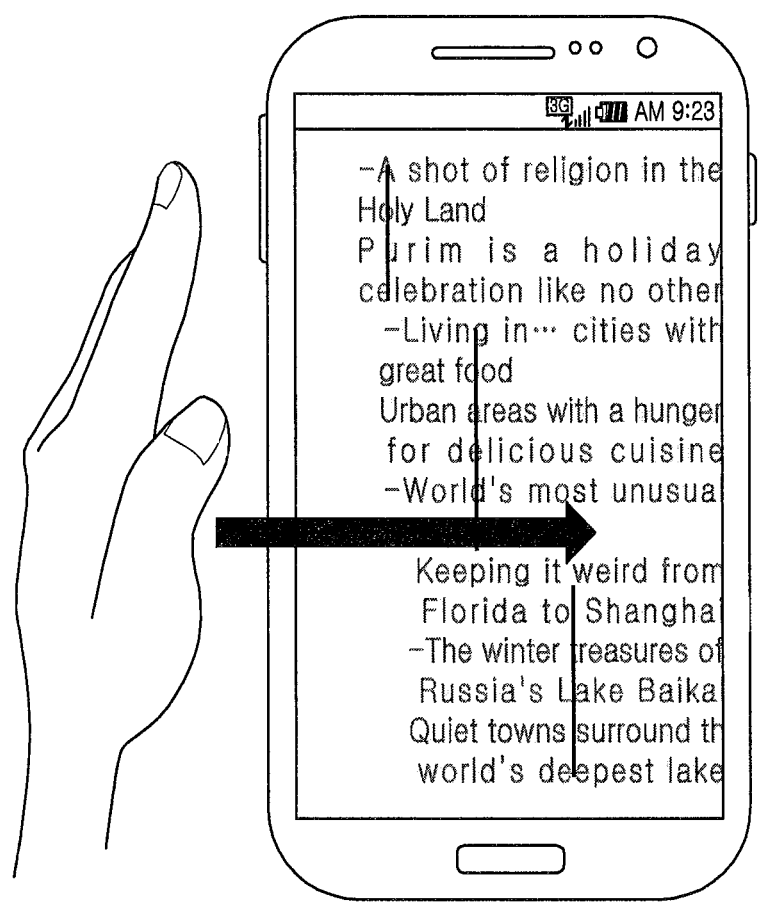
Figure 11C:
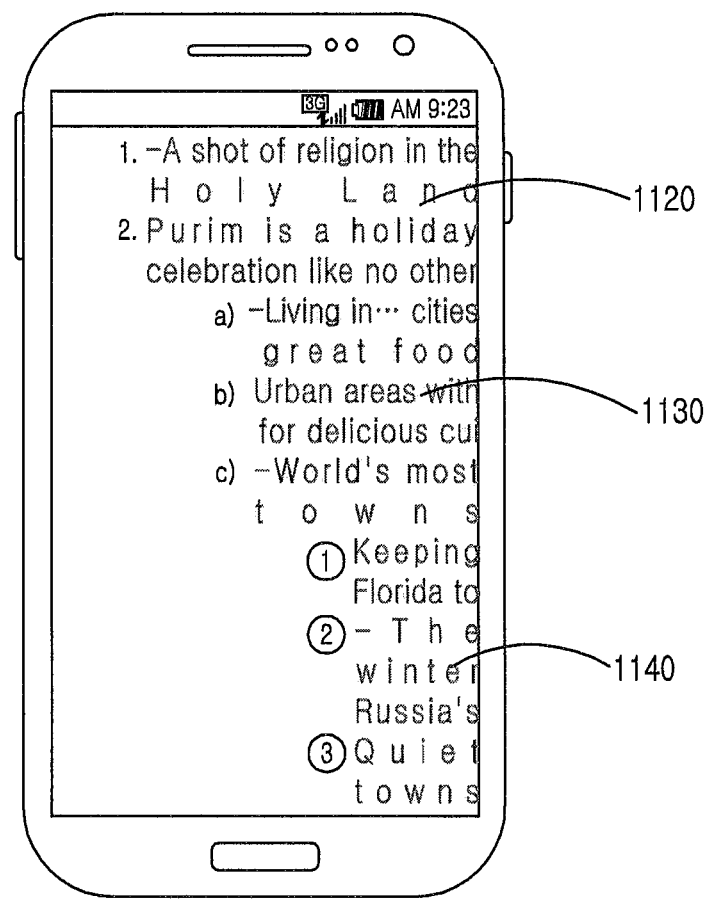

FIGS. 11A to 11C illustrate screen configurations for editing text based on a plurality of object edit references in an electronic device according to various embodiments of the present disclosure.

Referring to FIG. 11A, the electronic device 100 may display text on the display unit 160. The electronic device 100 may set a plurality of object edit references 1100, 1102 and 1104 in different portions of text displayed on the display unit 160 at different intervals based on input information provided from the input unit 170. The electronic device 100 may set the portions of text, in which the object edit references 1100, 1102 and 1104 are set, to object edit areas.

When a motion input of an air gesture 1110 is detected through the motion sensor 130 as illustrated in FIG. 11B, the electronic device 100 may edit text included in the object edit areas in which the object edit references 1100, 1102 and 1104 are set based on configuration information of the object edit references 1110, 1102 and 1104 and the air gesture 1110. For example, when it is assumed that "left indentation" is mapped to the plurality of object edit references 1100, 1102 and 1104 set at different intervals and the air gesture 1110, the electronic device 100 may perform "left indentation" on text included in the first object edit area 1120 in which the first object edit reference 1100 is set based on the first object edit reference 1100 as illustrated in FIG. 11C. The electronic device 100 may perform "left indentation" on text included in the second object edit area 1130, in which the second object edit reference 1102 is set, on the second object edit reference 1102, and perform "left indentation" on text included in the third object edit area 1140, in which the third object edit reference 1104 is set, on the third object edit reference 1104 as illustrated in FIG. 11C. In this case, the electronic device 100 may add "bullets and numbering" information to respective sentences according to indentation intervals.

Figure 12:
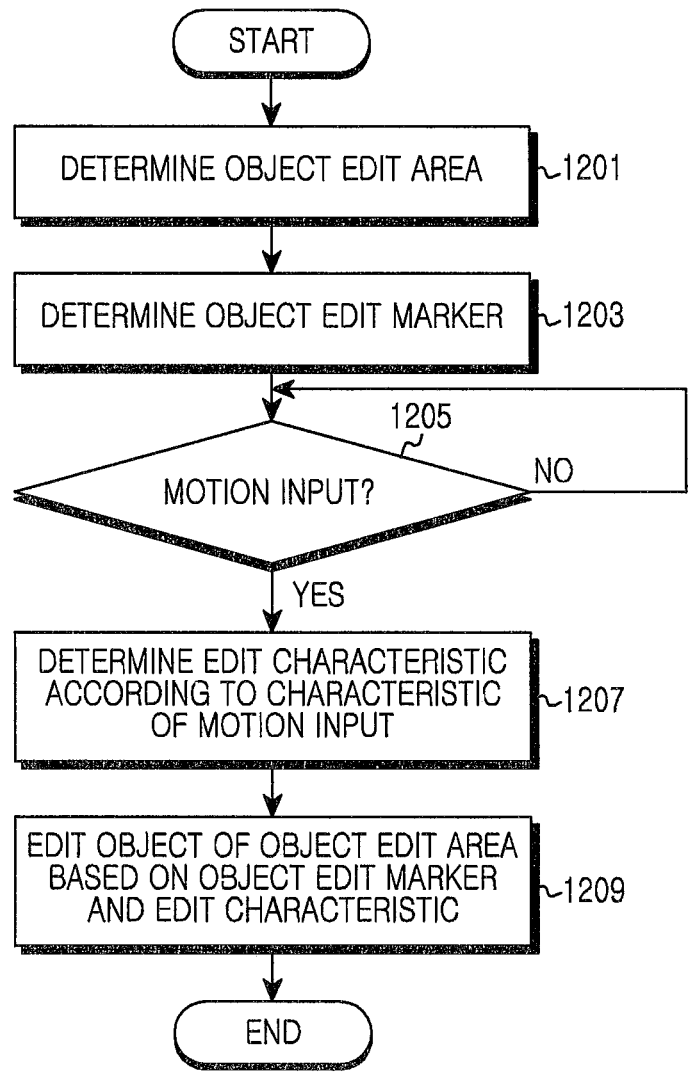
FIG. 12 illustrates a process of editing an object in an electronic device according to various embodiments of the present disclosure.

FIG. 12 illustrates a process of editing an object in an electronic device according to various embodiments of the present disclosure.

Referring to FIG. 12, the electronic device may determine an object edit area for editing of one or more objects displayed on the display unit 160 in operation 1201. For example, the electronic device may determine an object edit area based on input information detected through the input unit 170. As another example, the electronic device may determine one or more objects, at which a cursor is positioned, as part of an object edit area among one or more objects displayed on the display unit 160.

The electronic device may determine an object edit reference for the one or more objects included in the object edit area in operation 1203. For example, the electronic device may determine one or more object edit references based on touch information with respect to the one or more objects displayed on the display unit 160. As another example, the electronic device may determine one or more object edit references based on hovering information with respect to the one or more objects displayed on the display unit 160.

The electronic device may check whether a motion input is detected in operation 1205. For example, the electronic device may check whether a motion input, such as a gesture of a user or a motion of the electronic device 100, is detected through the motion sensor 130.

When a motion input is not detected, the electronic device may check whether a motion input is detected continuously for a reference time interval.

When a motion input is detected, the electronic device may determine an edit style by using one or more of configuration information of an object edit reference and a characteristic of the motion input in operation 1207. For example, the electronic device may identify an edit style mapped to the configuration information of the object edit reference and the motion input through the data storage unit 111.

The electronic device may edit the one or more objects included in the object edit area based on the object edit reference and a characteristic of the motion input in operation 1209. The electronic device may edit the one or more objects included in the object edit area based on the edit style mapped to the motion input detected in operation 1207 and the object edit reference. For example, the electronic device may edit text in which the object edit reference is a set area based on the edit style mapped to the motion input and the object edit reference as described with reference to FIGS. 13A to 13C.

In the above-described embodiment, the electronic device may set the object edit area after switching to an object edit mode according to an object edit event. For example, the electronic device may detect whether the object edit event occurs by using one or more of an object edit icon, an object edit menu, and an object edit gesture.

Figure 13A:
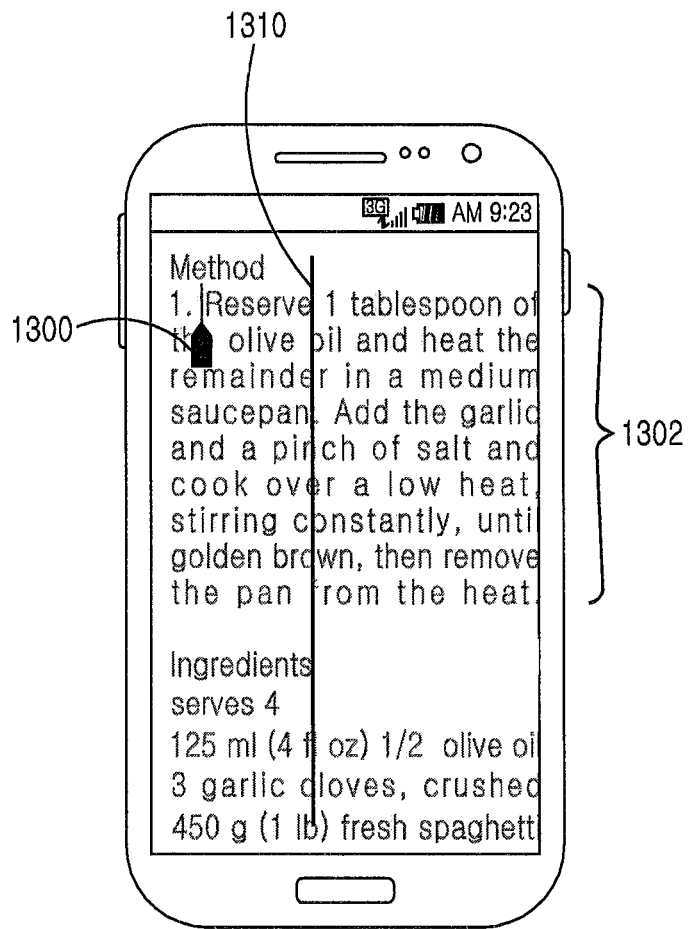
FIGS. 13A to 13C illustrate screen configurations for editing text based on an object edit reference in an electronic device according to various embodiments of the present disclosure.
Figure 13B:
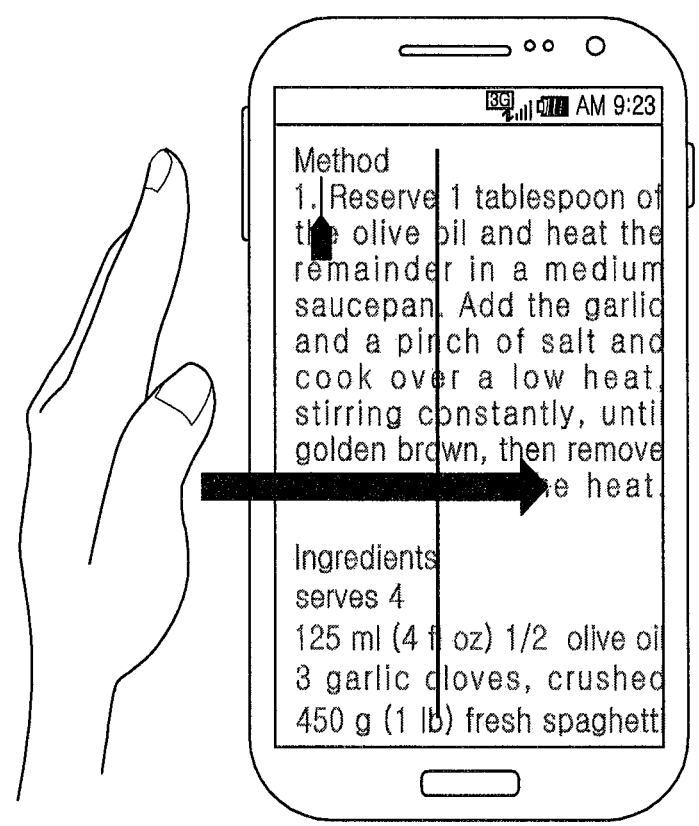
Figure 13C:
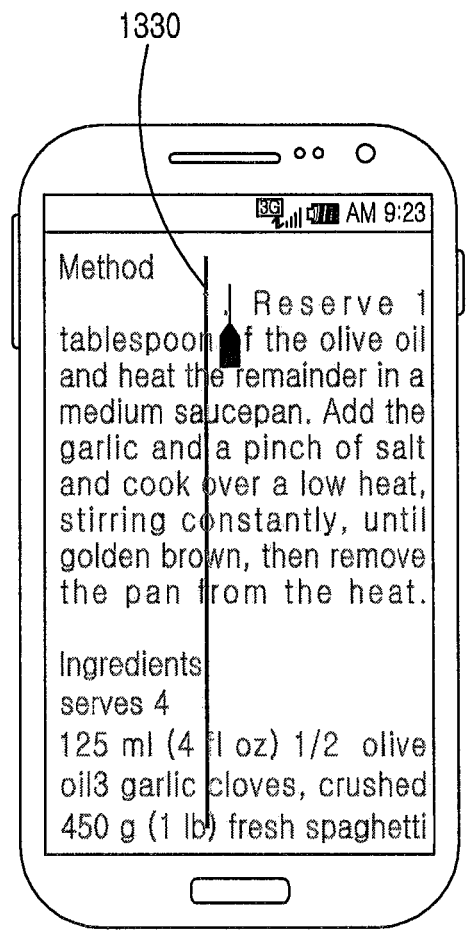

FIGS. 13A to 13C illustrate screen configurations for editing text based on an object edit reference in an electronic device according to various embodiments of the present disclosure.

Referring to FIG. 13A, the electronic device 100 may display text on the display unit 160. The electronic device 100 may set an object edit reference 1310 in text displayed on the display unit 160 based on input information provided from the input unit 170. The electronic device 100 may set a paragraph in which a cursor is positioned to an object edit area 1302.

When a motion input of an air gesture 1320 is detected through the motion sensor 130 as illustrated in FIG. 13B, the electronic device 100 may edit text included in the object edit area 1302 based on the object edit reference 1310 and a characteristic of the air gesture 1320. For example, when it is assumed that "first line indentation" is mapped to the single object edit reference 1310 and the air gesture 1320, the electronic device 100 may perform "first line indentation" on the text included in the object edit area 1302 based on the object edit reference 1310 as illustrated in FIG. 13C (1330).

In the above-described embodiment, the electronic device may edit the text displayed on the display unit 160 based on the object display reference and a characteristic of the motion input.

In another embodiment, the electronic device may edit an object displayed in a table format according to an object edit reference and a characteristic of a motion input as will be described with reference to FIGS. 14A to 14C, 15A to 15C, and 16A to 16C.

Figure 14A:
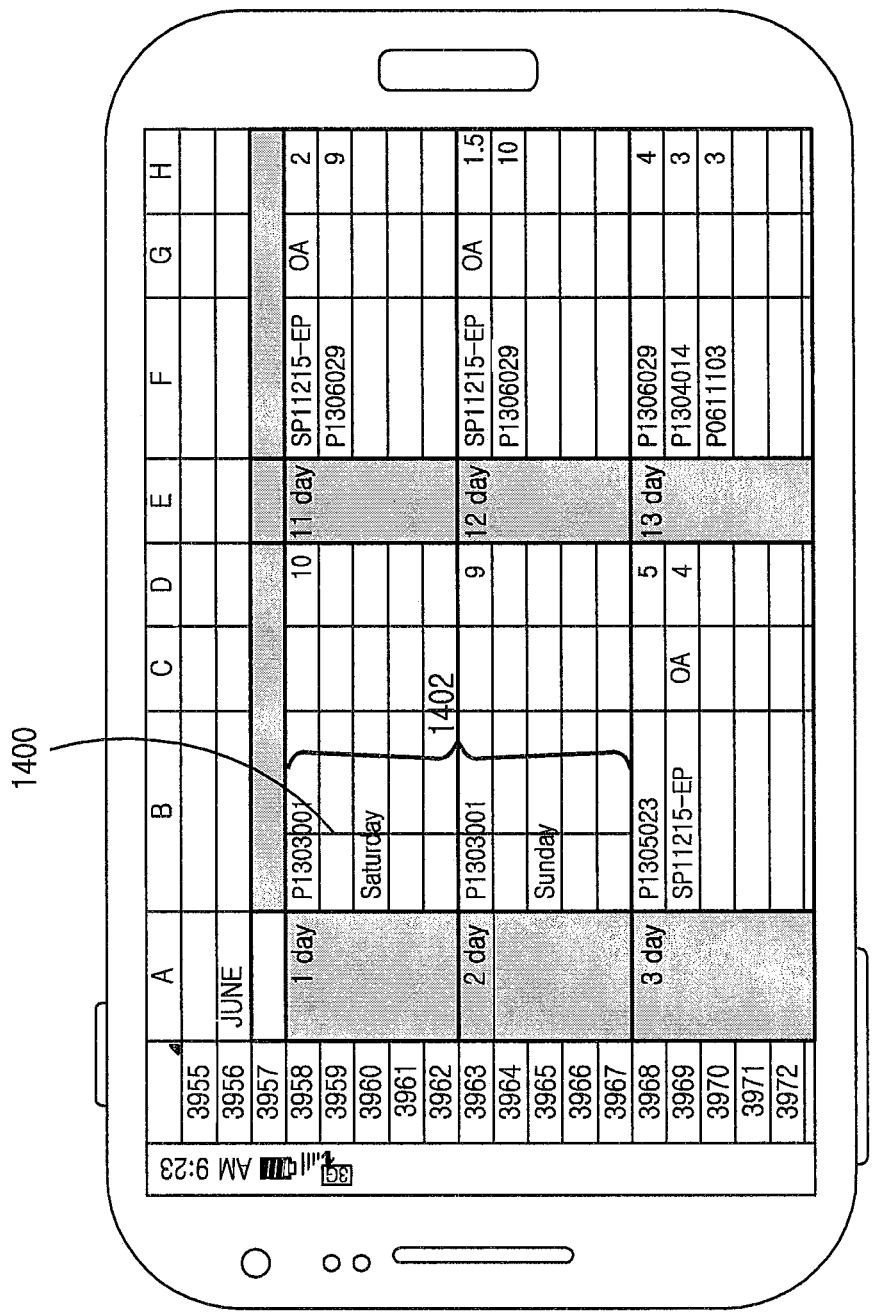
FIGS. 14A to 14C illustrate screen configurations for editing text based on object edit references in an electronic device according to various embodiments of the present disclosure.
Figure 14B:
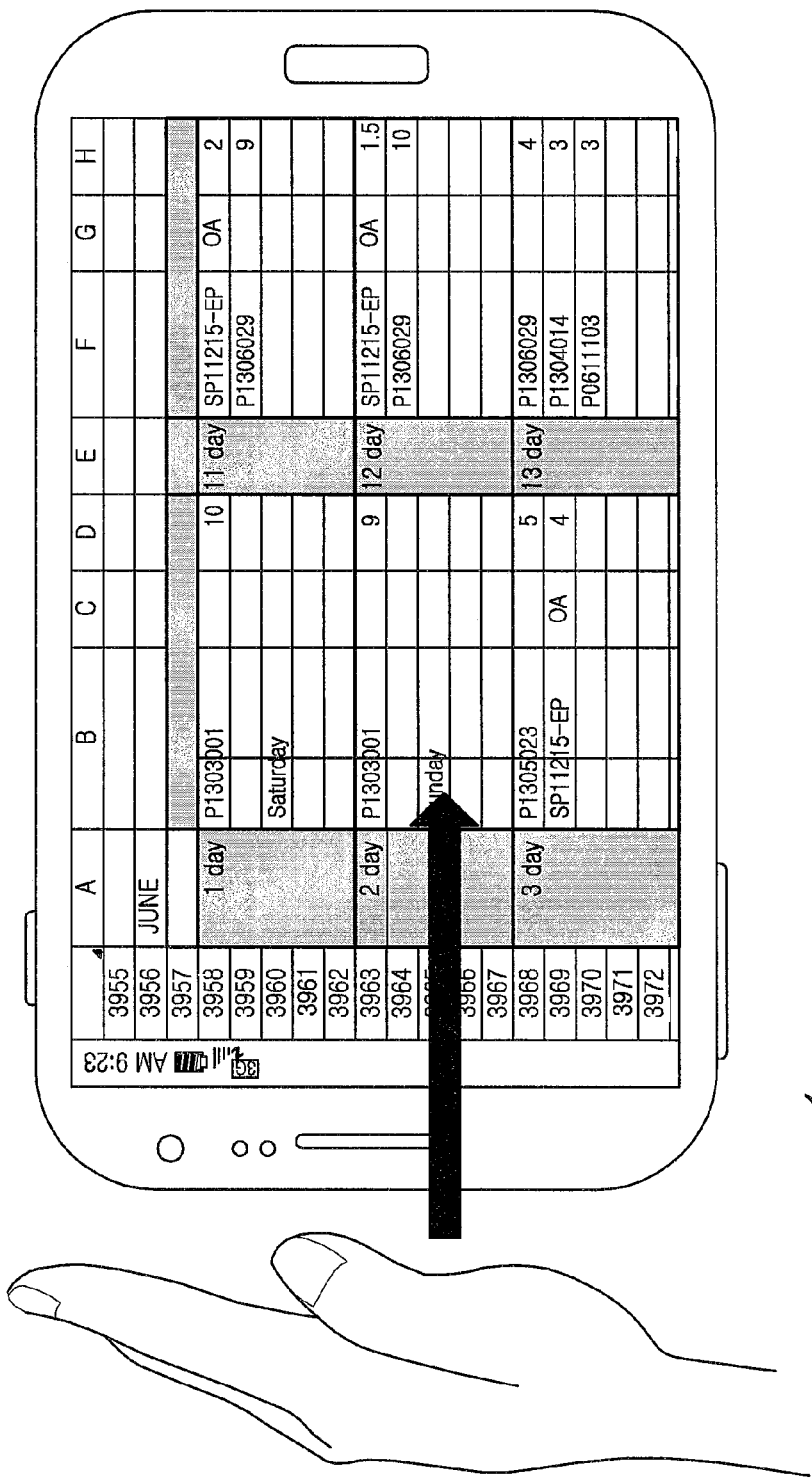
Figure 14C:
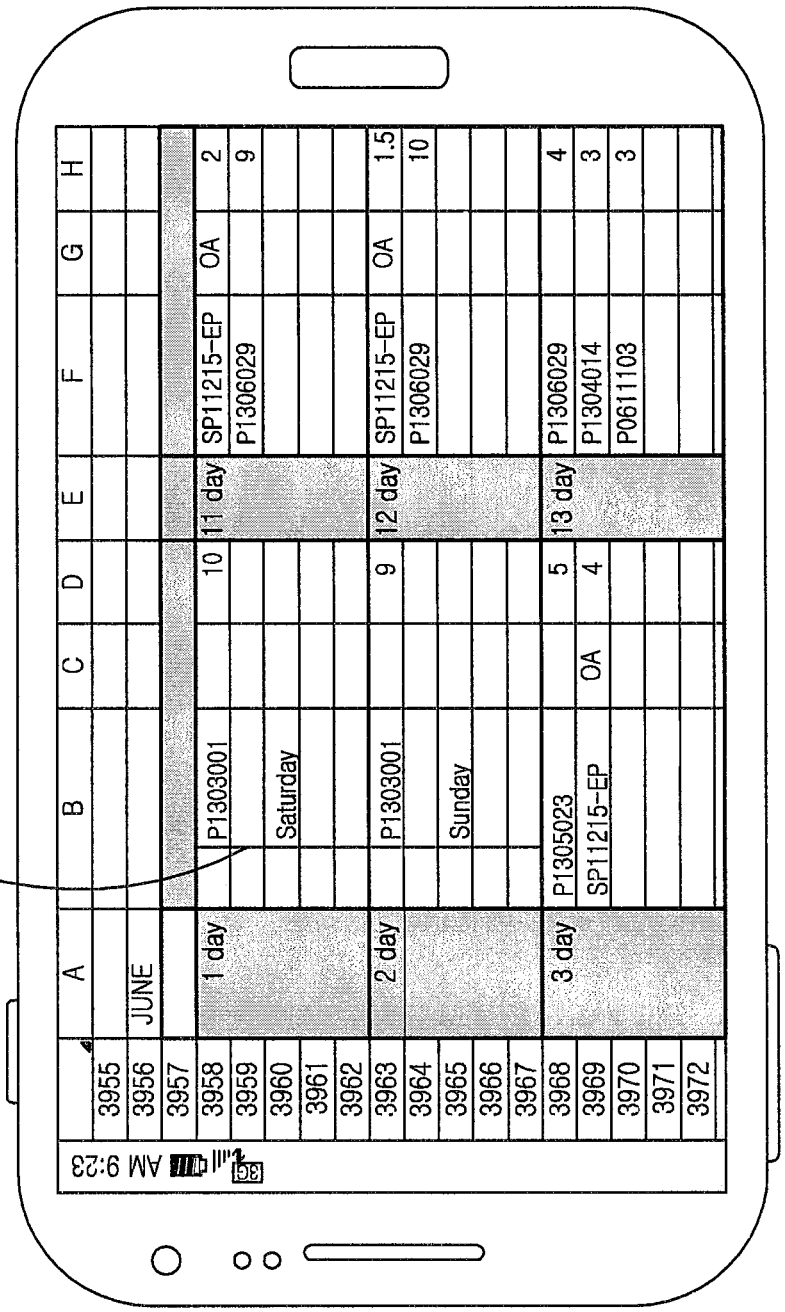

FIGS. 14A to 14C illustrate screen configurations for editing text based on object edit references in an electronic device according to various embodiments of the present disclosure.

Referring to FIG. 14A, the electronic device 100 may display one or more objects configured in a table format on the display unit 160. The electronic device 100 may set an object edit reference 1400 in a portion 1402 of the object displayed on the display unit 160 based on input information provided from the input unit 170. The electronic device 100 may set the portion 1402 in which the object edit reference 1400 is set to an object edit area.

When a motion input of an air gesture 1410 is detected through the motion sensor 130 as illustrated in FIG. 14B, the electronic device 100 may edit text included in the object edit area 1402 based on the object edit reference 1400 and a characteristic of the air gesture 1410. For example, when it is assumed that "left indentation" is mapped to the single object edit reference 1400 and the air gesture 1410, the electronic device 100 may perform "left indentation" on the text included in the object edit area 1402 based on the object edit reference 1400 as illustrated in FIG. 14C (1420).

Figure 15A:
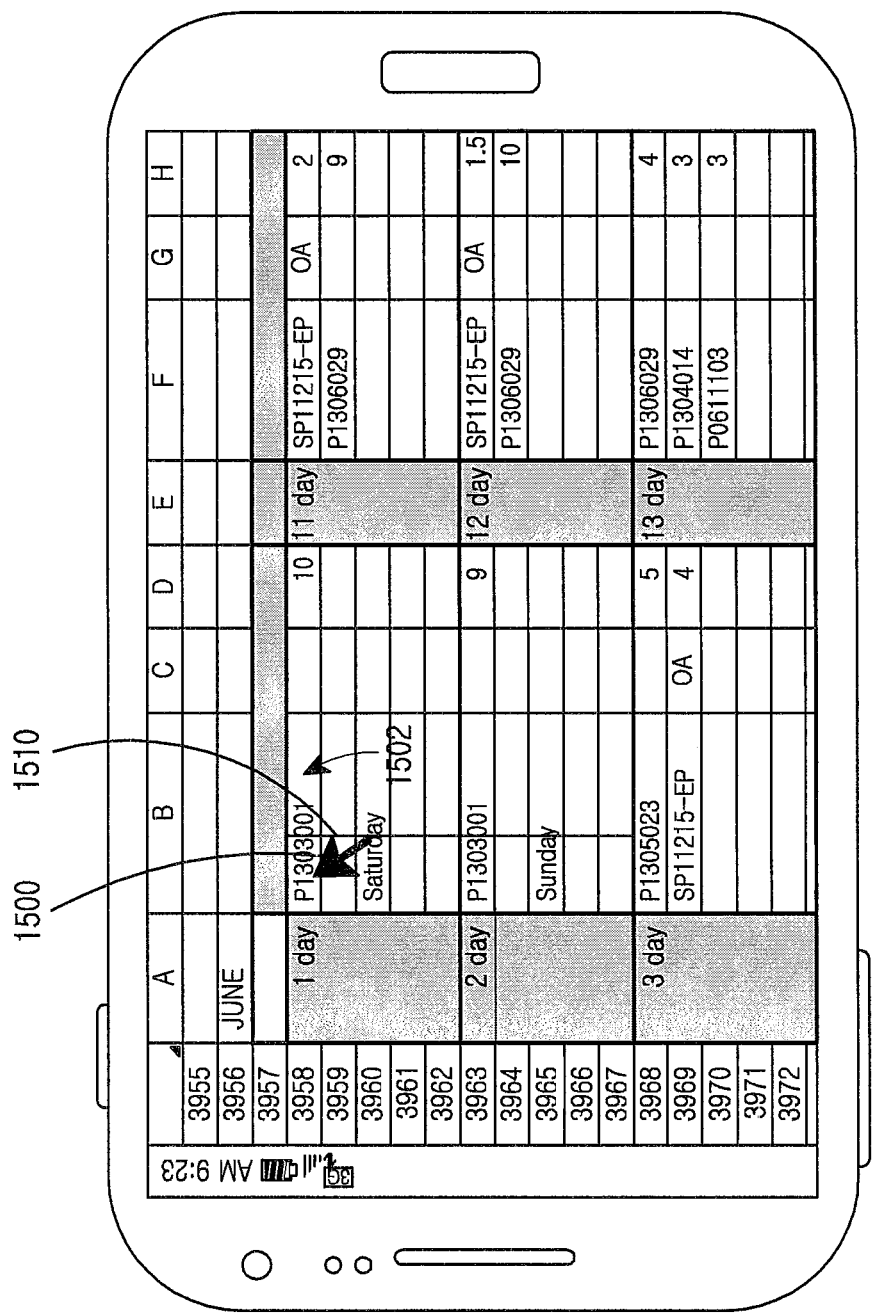
FIGS. 15A to 15C illustrate screen configurations for editing text based on object edit references in an electronic device according to various embodiments of the present disclosure.
Figure 15B:
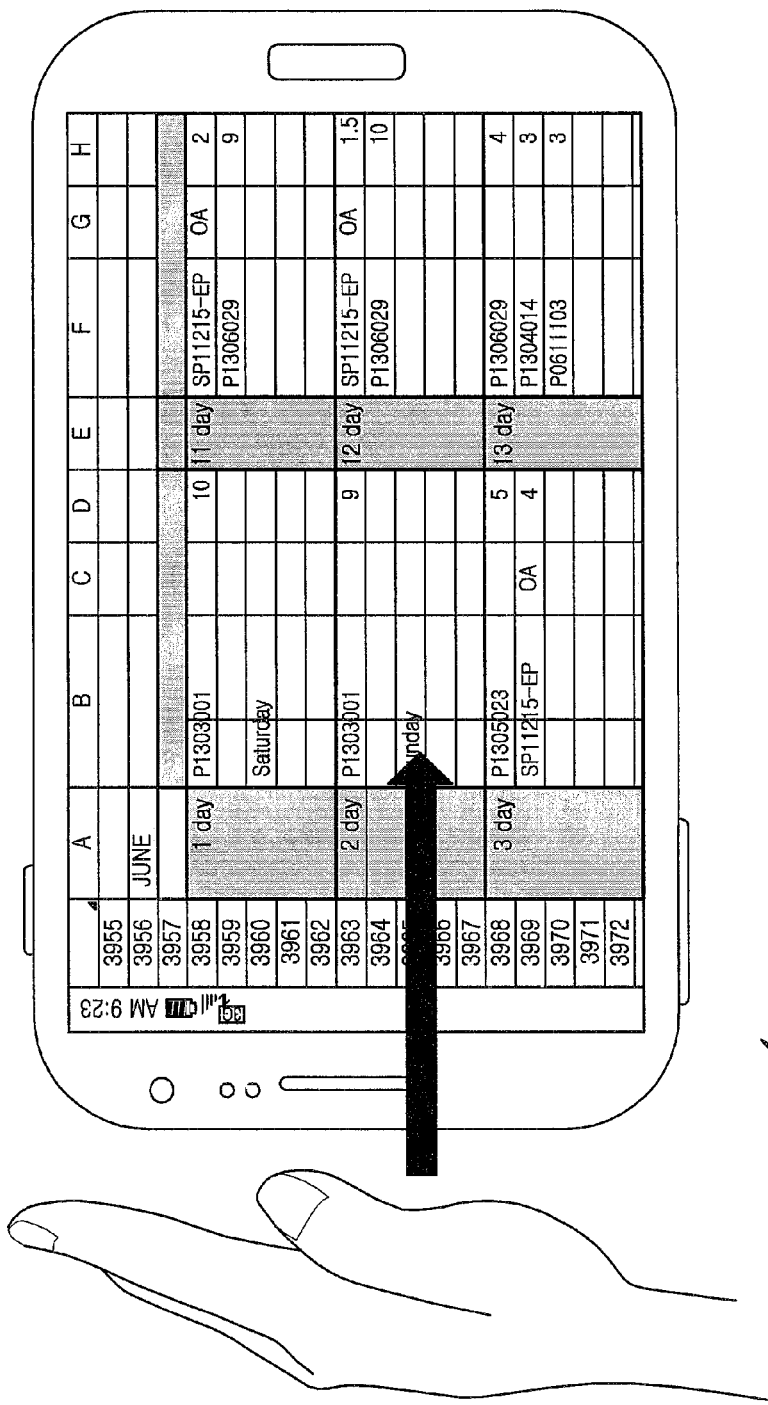
Figure 15C:
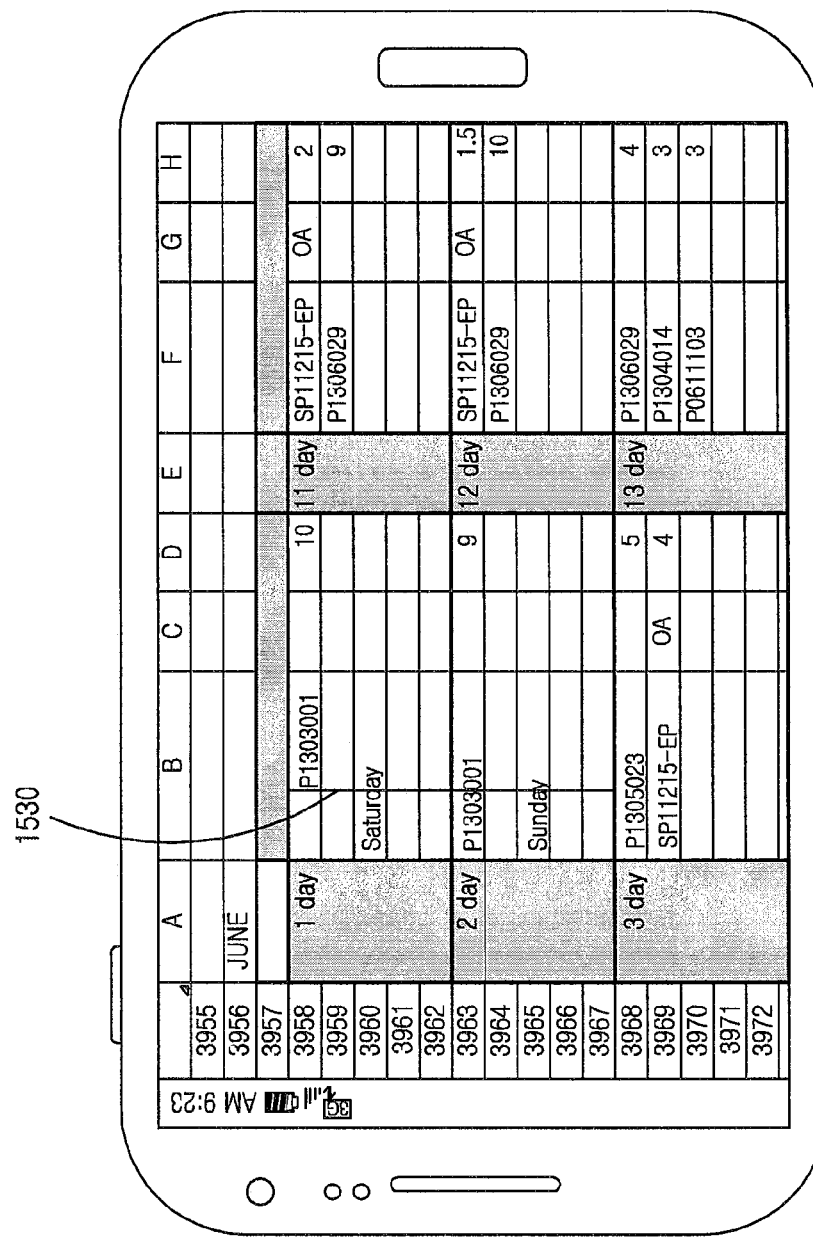

FIGS. 15A to 15C illustrate screen configurations for editing text based on object edit references in an electronic device according to various embodiments of the present disclosure.

Referring to FIG. 15A, the electronic device 100 may display one or more objects configured in a table format on the display unit 160. The electronic device 100 may set an object edit reference 1510 in a portion of an object displayed on the display unit 160 according to input information provided from the input unit 170. The electronic device 100 may set a field 1502 of a table in which a cursor 1500 is positioned to an object edit area.

When a motion input of an air gesture 1520 is detected through the motion sensor 130 as illustrated in FIG. 15B, the electronic device 100 may edit text included in the object edit area 1502 based on the object edit reference 1510 and a characteristic of the air gesture 1520. For example, when it is assumed that "first line indentation" is mapped to the single object edit reference 1510 and the air gesture 1520, the electronic device 100 may perform "first line indentation" on the text included in the object edit area 1502 based on the object edit reference 1510 as illustrated in FIG. 15C (1530).

Figure 16A:
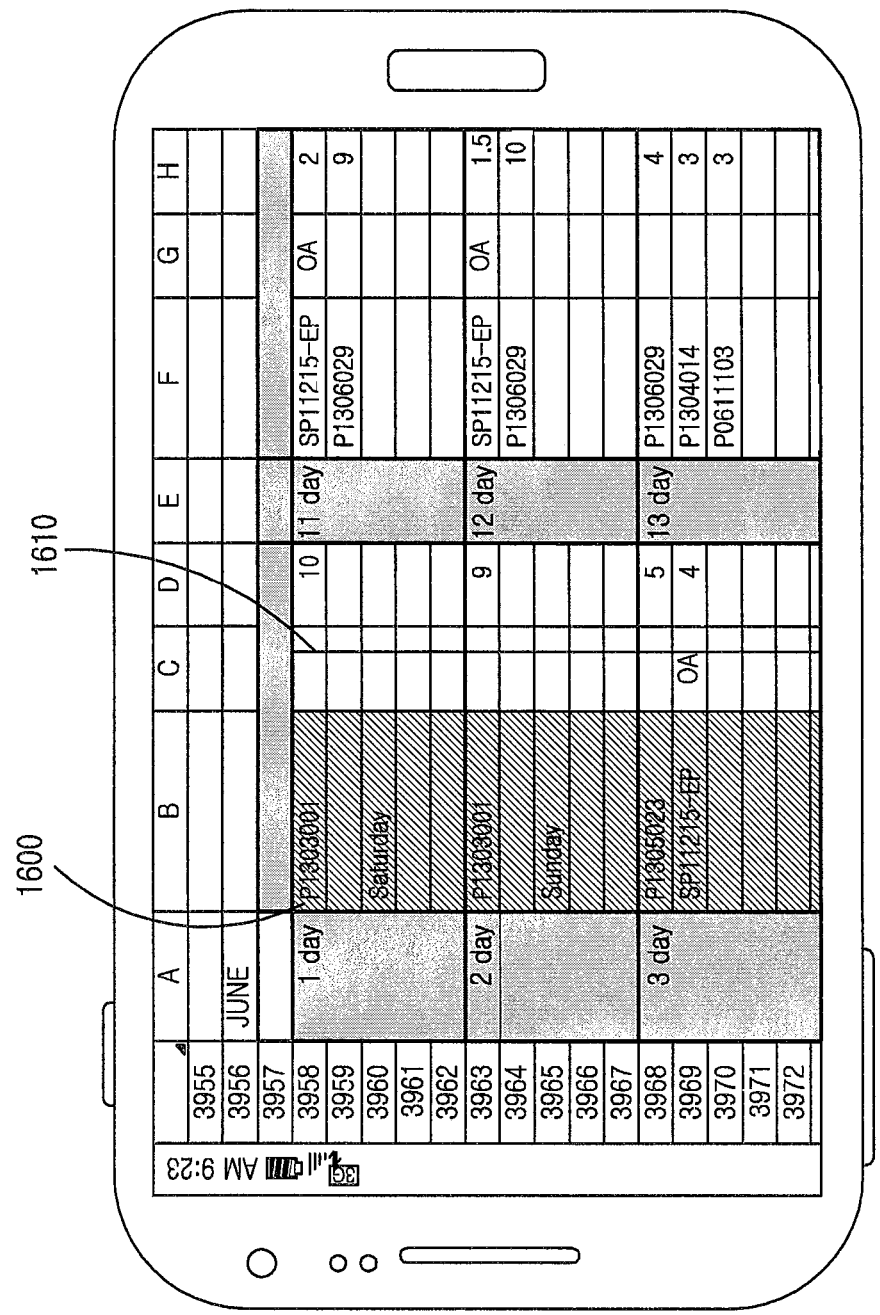
FIGS. 16A to 16C illustrate screen configurations for editing an specific area based on object edit references in an electronic device according to various embodiments of the present disclosure.
Figure 16B:
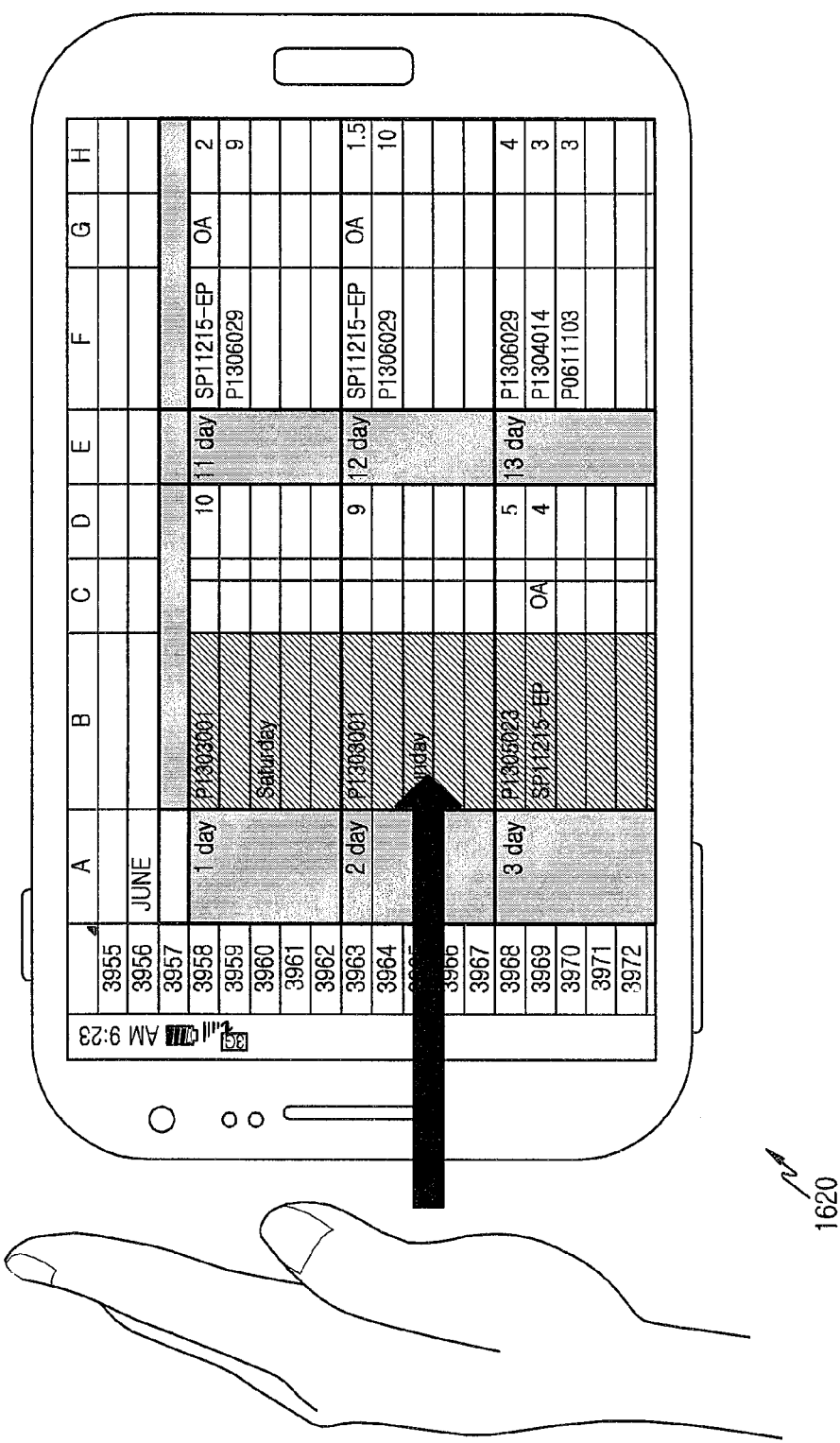
Figure 16C:
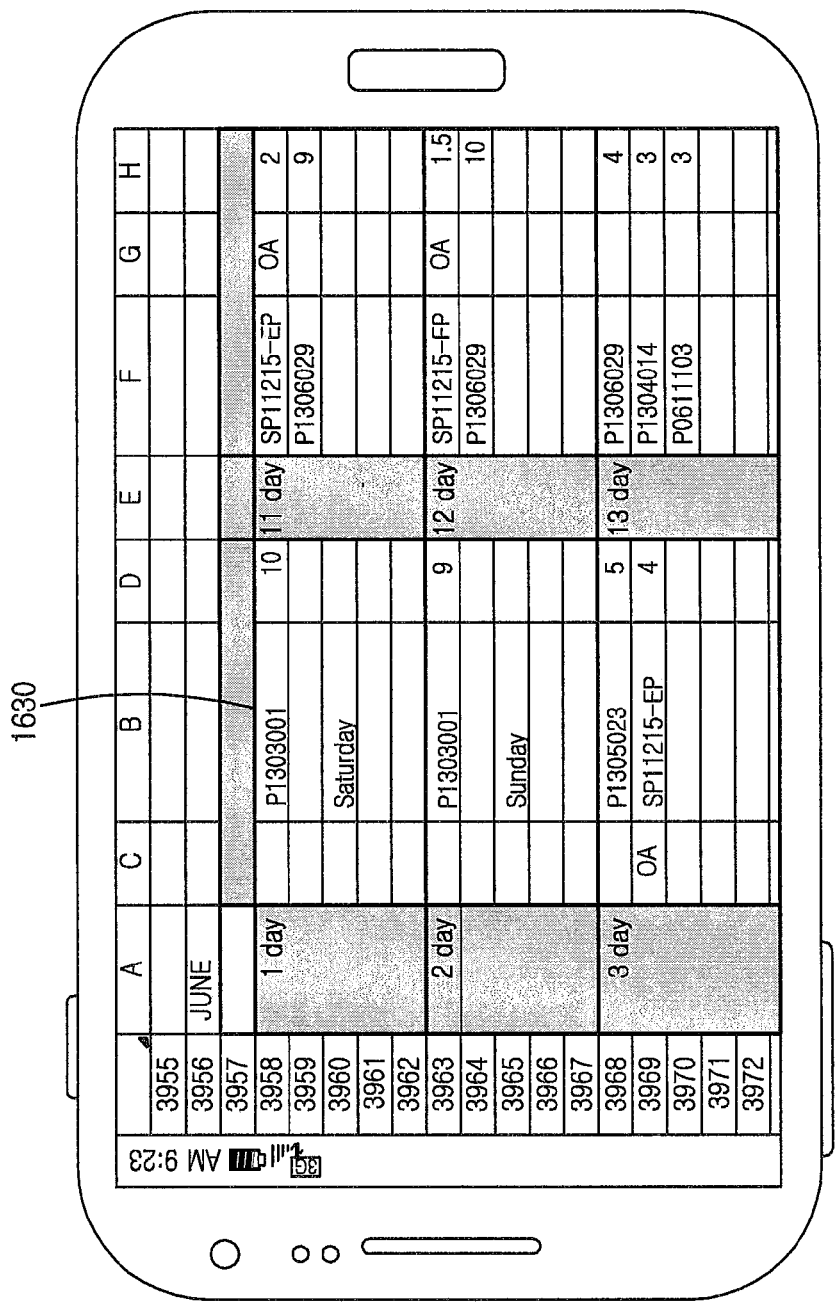

FIGS. 16A to 16C illustrate screen configurations for editing an specific area based on object edit references in an electronic device according to various embodiments of the present disclosure.

Referring to FIG. 16A, the electronic device 100 may display one or more objects configured in a table format on the display unit 160. The electronic device 100 may set a portion of an object displayed on the display unit 160 to an object edit area 1600 according to input information provided from the input unit 170. The electronic device 100 may set an object edit reference 1610 for the object edit area 1600 according to input information provided from the input unit 170.

When a motion input of an air gesture 1620 is detected through the motion sensor 130 as illustrated in FIG. 16B, the electronic device 100 may edit text included in the object edit area 1600 based on the object edit reference 1610 and a characteristic of the air gesture 1620. For example, when it is assumed that "swap ranges" is mapped to the single object edit reference 1610 and the air gesture 1620, the electronic device 100 may change the position of the object edit area 1600 based on the object edit reference 1610 as illustrated in FIG. 16C (1630).

FIGS. 17A to 17D illustrate screen configurations for editing an image based on object edit references in an electronic device according to various embodiments of the present disclosure.

Figure 17A:
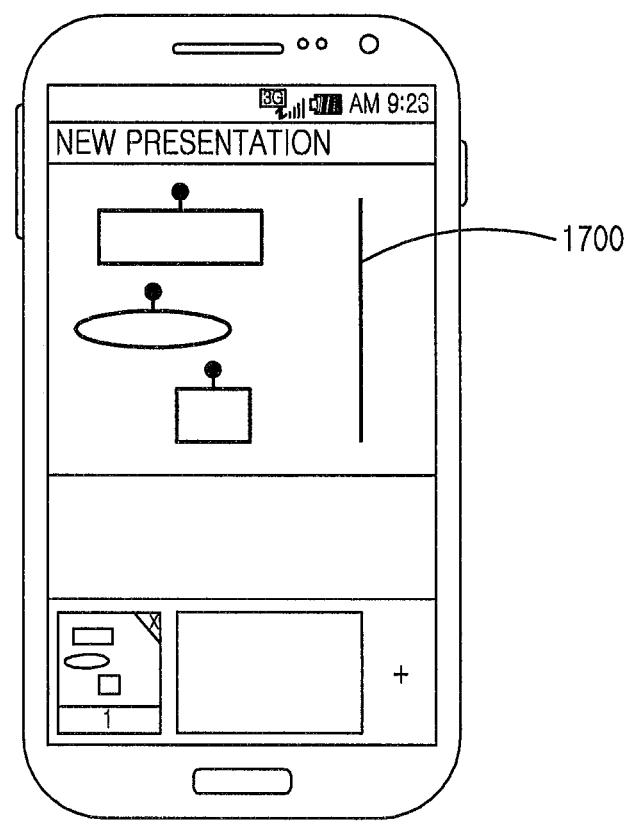
FIGS. 17A to 17D illustrate screen configurations for editing an image based on object edit references in an electronic device according to various embodiments of the present disclosure.

Referring to FIG. 17A, the electronic device 100 may display one or more images on the display unit 160. The electronic device 100 may set an object edit reference 1700 for alignment of the images displayed on the display unit 160 according to input information provided from the input unit 170.

Figure 17B:
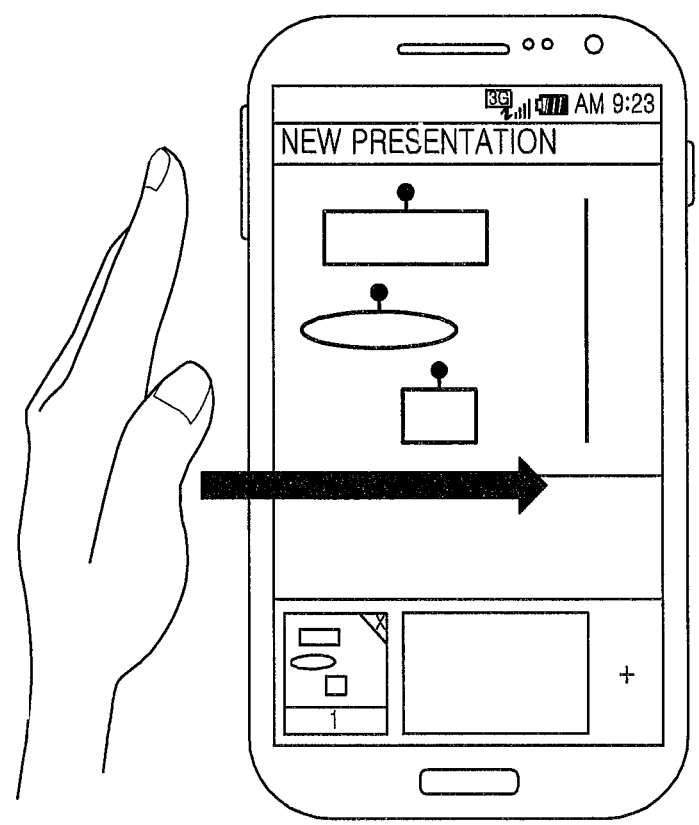
Figure 17C:
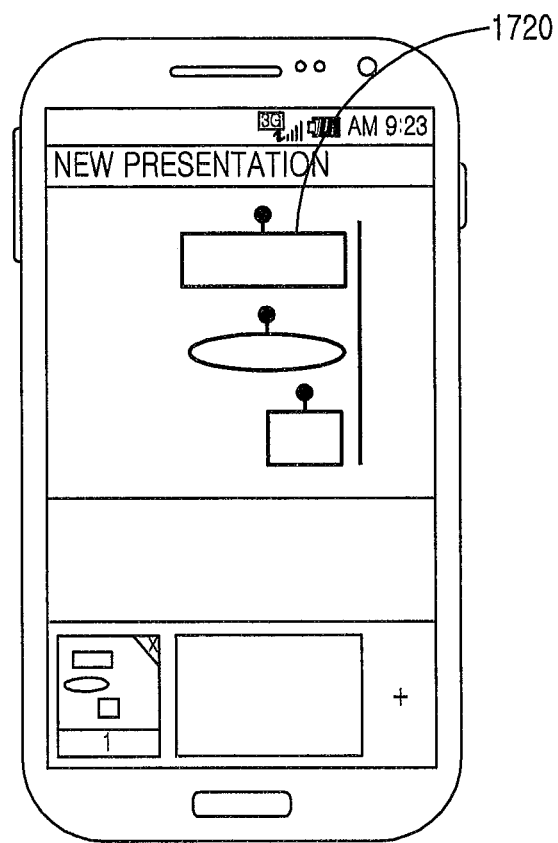
Figure 17D:
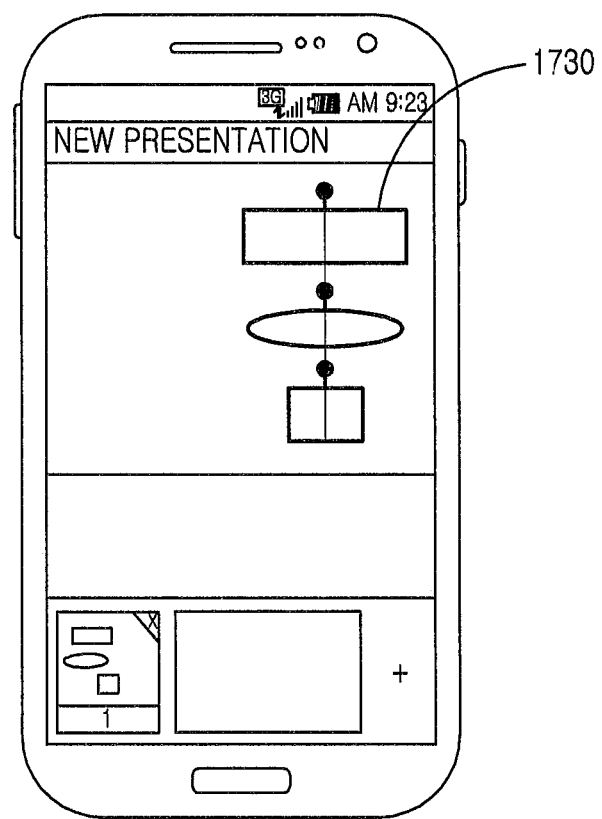

When a motion input of an air gesture 1710 is detected through the motion sensor 130 as illustrated in FIG. 17B, the electronic device 100 may aligns the images displayed on the display unit 160 with the object edit reference 1700 based on a characteristic of the air gesture 1410. For example, the electronic device 100 may align the images displayed on the display unit 160 with the object edit reference 1700 according to right alignment based on the characteristic of the air gesture 1710 as illustrated in FIG. 17B. When the motion input for the air gesture 1710 is again detected after alignment of the images displayed on the display unit 160 with the object edit reference 1700, the electronic device may align the center of the images displayed on the display unit 160 based on the object edit reference 1700 as illustrated in FIG. 17D. As another example, the electronic device 100 may align the center of the images displayed on the display unit 160 with the object edit reference 1700 based on the characteristic of the air gesture 1710 of FIG. 17B as illustrated in FIG. 17D (1730).

In the above-described embodiment, the electronic device may align the images displayed on the display unit 160 with the object edit reference 1700.

In another embodiment, the electronic device may align one or more images selected according to input information detected through the input unit 170 among the images displayed on the display unit 160 with the object edit reference 1700.

The electronic device 100 may edit a document for presentation based on an object edit reference and a characteristic of a motion input as described with reference to FIGS. 18A to 18C and 19A to 19C.

Figure 18A:
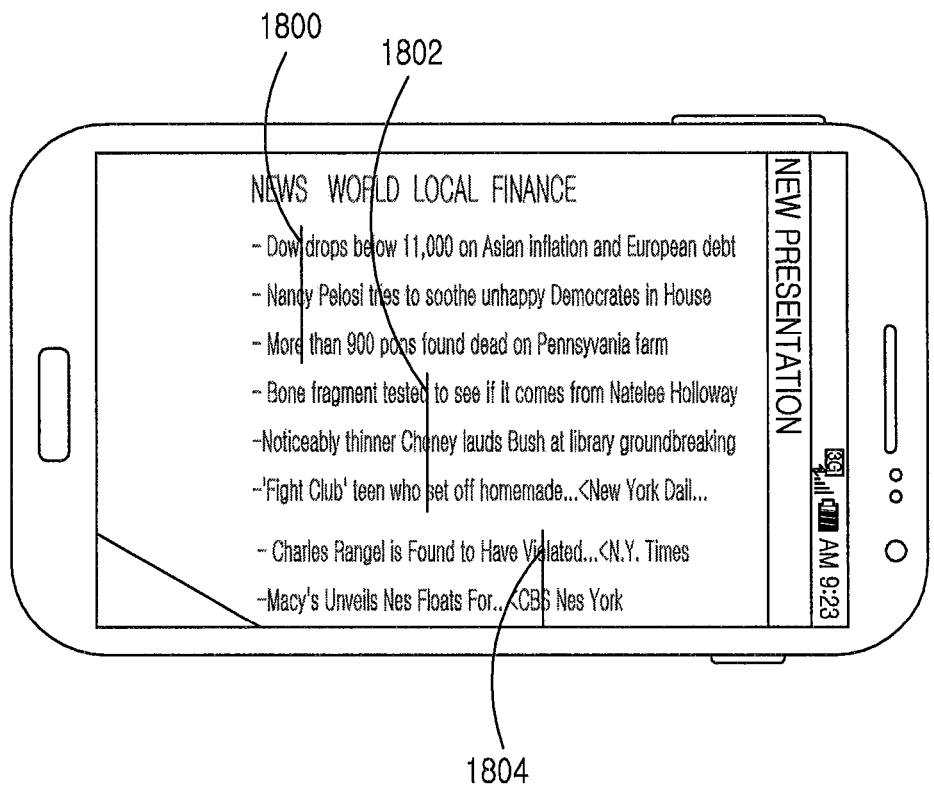
FIGS. 18A to 18C illustrate screen configurations for editing text based on a plurality of object edit references in an electronic device according to various embodiments of the present disclosure.
Figure 18B:
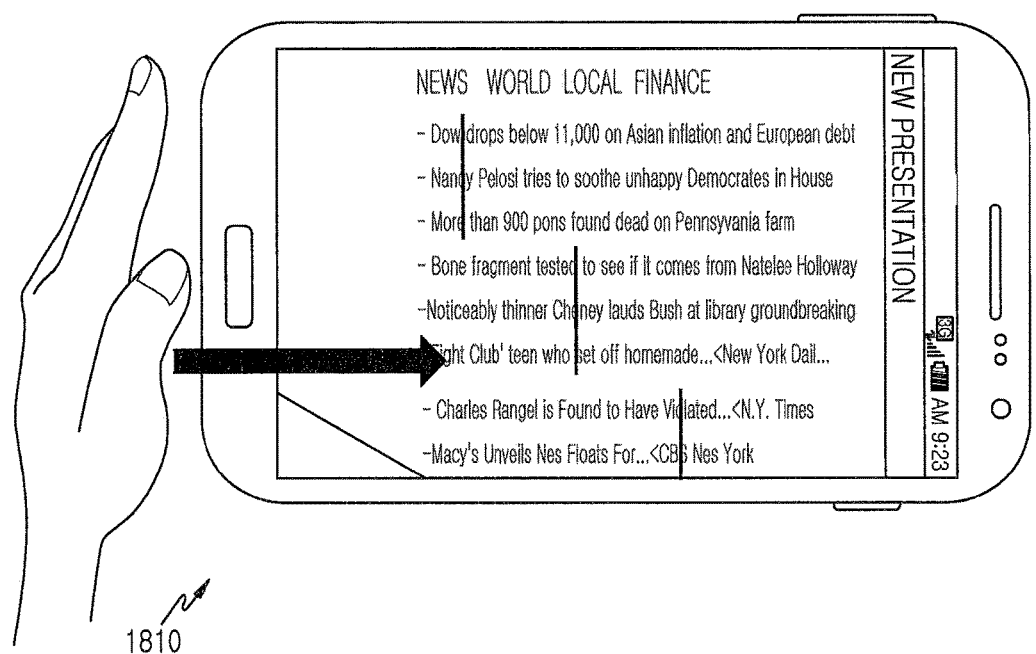
Figure 18C:
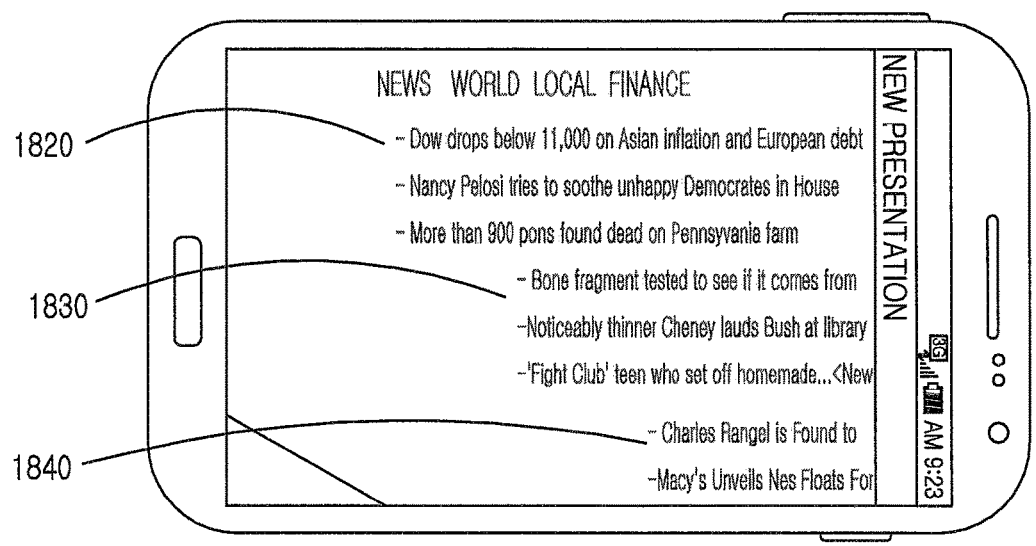

FIGS. 18A to 18C illustrate screen configurations for editing text based on a plurality of object edit references in an electronic device according to various embodiments of the present disclosure.

Referring to FIG. 18A, the electronic device 100 may display text on the display unit 160. The electronic device 100 may set a plurality of object edit references 1800, 1802 and 1804 in different portions of text displayed on the display unit 160 at different intervals based on input information provided from the input unit 170. The electronic device 100 may set the portions of text, in which the object edit references 1800, 1802 and 1804 are set, to object edit areas.

When a motion input of an air gesture 1810 is detected through the motion sensor 130 as illustrated in FIG. 18B, the electronic device 100 may edit text included in the object edit areas in which the object edit references 1800, 1802 and 1804 are set based on configuration information of the object edit references 1800, 1802 and 1804 and the air gesture 1810. For example, when it is assumed that "left indentation" is mapped to the plurality of object edit references 1800, 1802 and 1804 set at the different intervals and the air gesture 1810, the electronic device 100 may perform "left indentation" on text included in the first object edit area 1820 in which the first object edit reference 1800 is set based on the first object edit reference 1800 as illustrated in FIG. 18C. The electronic device 100 may perform "left indentation" on text included in the second object edit area 1830, in which the second object edit reference 1802 is set, on the second object edit reference 1802, and perform "left indentation" on text included in the third object edit area 1840, in which the third object edit reference 1804 is set, on the third object edit reference 1804 as illustrated in FIG. 18C. In this case, the electronic device 100 may add "bullets and numbering" information to respective sentences according to indentation intervals.

Figure 19A:
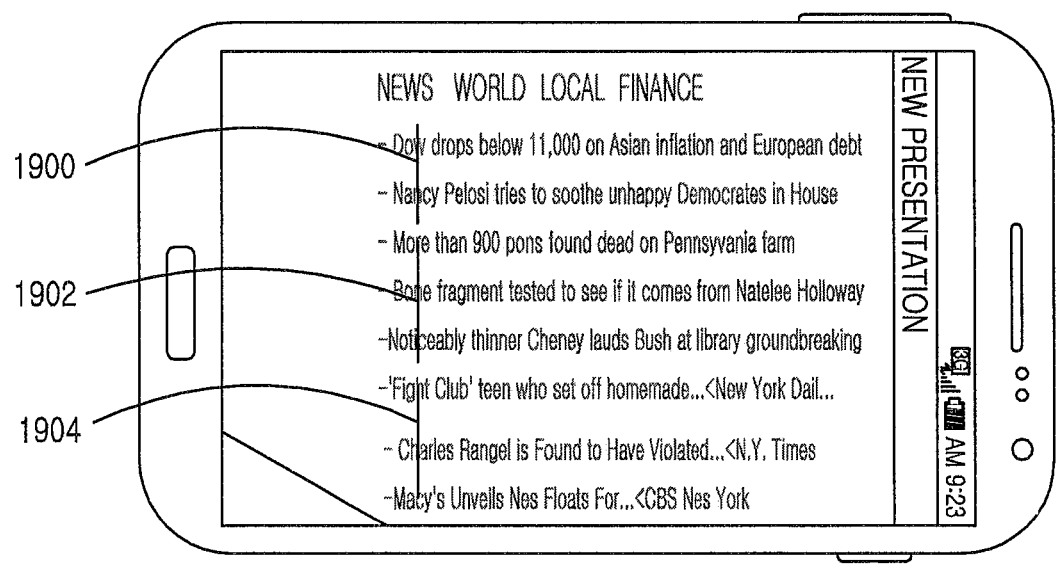
FIGS. 19A to 19C illustrate screen configurations for editing text based on a plurality of object edit references in an electronic device according to various embodiments of the present disclosure.
Figure 19B:
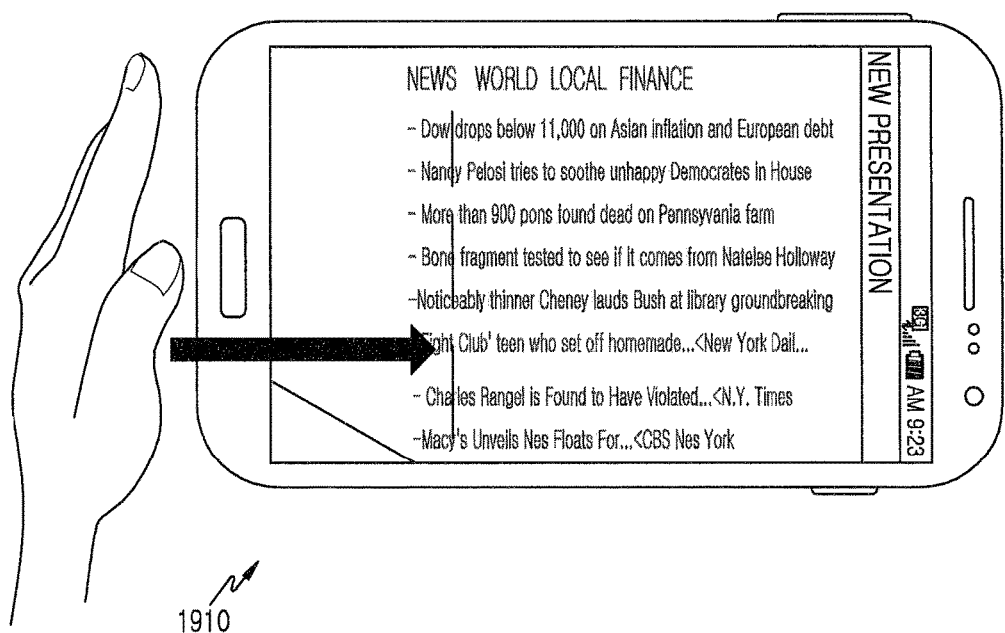
Figure 19C:
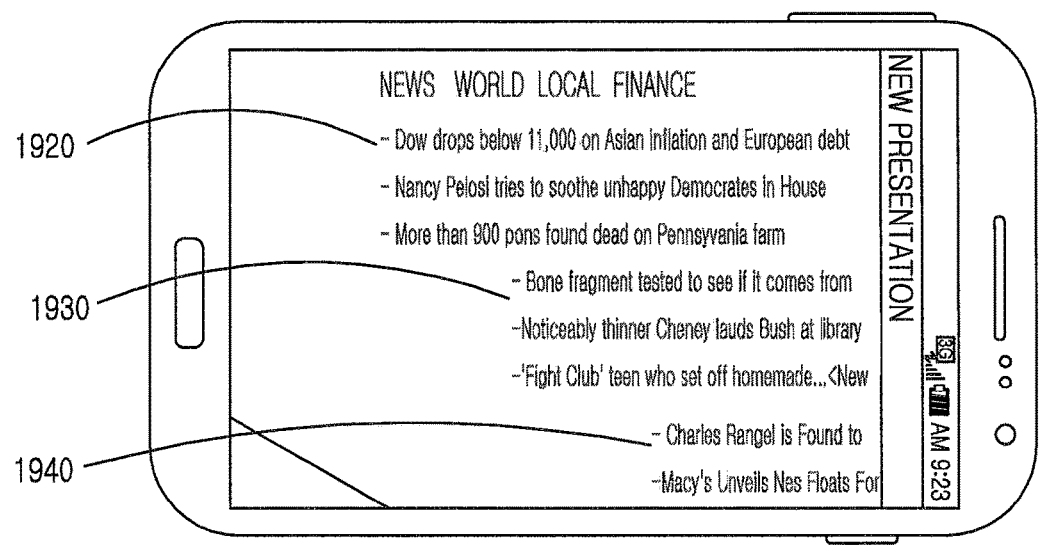

FIGS. 19A to 19C illustrate screen configurations for editing text based on a plurality of object edit references in an electronic device according to various embodiments of the present disclosure.

Referring to FIG. 19A, the electronic device 100 may display text on the display unit 160. The electronic device 100 may set a plurality of object edit references 1900, 1902 and 1904 in different portions of text displayed on the display unit 160 in a row based on input information provided from the input unit 170. The electronic device 100 may set the portions of text, in which the object edit references 1900, 1902 and 1904 are set, to object edit areas.

When a motion input of an air gesture 1910 is detected through the motion sensor 130 as illustrated in FIG. 19B, the electronic device 100 may edit text included in the object edit areas in which the object edit references 1900, 1902 and 1904 are set based on configuration information of the object edit references 1900, 1902 and 1904 and the air gesture 1910. For example, when it is assumed that "left indentation" is mapped to the plurality of object edit references 1900, 1902 and 1904 set in a row and the air gesture 1910, the electronic device 100 may perform "left indentation" on text included in the first object edit area 1920 in which the first object edit reference 1900 is set based on the first object edit reference 1900 as illustrated in FIG. 19C. The electronic device 100 may perform "left indentation" on text included in the second object edit area 1930, in which the second object edit reference 1902 is set, based on the second object edit reference 1902 and a preset first reference interval, and perform "left indentation" on text included in the third object edit area 1940, in which the third object edit reference 1004 is set, based on the third object edit reference 1004 and a preset second reference interval as illustrated in FIG. 19C. In this case, the electronic device 100 may add "bullets and numbering" information to respective sentences according to indentation intervals.

In the above-described embodiment, the electronic device may edit one or more objects displayed on the display unit 160 based on an object edit style and an object edit reference which are determined using one or more of configuration information of the object edit reference and a characteristic of a motion input.

In another embodiment, the electronic device may edit one or more objects displayed on the display unit 160 based on an edit style according to a characteristic of a motion input when an object edit reference is not set. For example, when a motion input of an air gesture is detected in a state where an object edit reference is not set, the electronic device may determine an edit style according to a characteristic of an air gesture. When it is assumed that "indentation" is mapped to the air gesture, the electronic device may perform "indentation" on text included in at least a portion of text displayed on the display unit 160 according to a reference interval preset in the electronic device.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

According to the embodiments as described above, the electronic device including the motion sensor edits an object displayed on a display area based on an object edit reference and a characteristic of a motion input detected through the motion sensor, allowing a user to easily edit the object displayed on the display area.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method in an electronic device, the method comprising:
    displaying a text including one or more paragraphs;
    after displaying the text, detecting a user touch input drawing a vertical indicator overlapping the text displayed on a display;
    displaying, in a region in which the user touch input is inputted, the vertical indicator overlapping the text displayed on the display;
    determining one or more paragraphs overlapped with at least one part of the vertical indicator among the one or more paragraphs included in the text;
    detecting a motion input across the vertical indicator; and
    in response to detecting the motion input across the vertical indicator, indenting, by an indentation distance, the determined one or more paragraphs based on a position of the vertical indicator and an intensity of the motion input across the vertical indicator,
    wherein the indentation distance is a horizontal distance between a virtual vertical line representing left margin of the determined one or more paragraphs and the vertical indicator.

2. The method of claim 1, wherein displaying the vertical indicator comprises displaying a vertical line shaped in a straight line according to input information detected through an input unit.

3. The method of claim 1, wherein displaying the vertical indicator comprises displaying a vertical line shaped in a straight line perpendicular to a direction of the text according to input information detected through an input unit.

4. The method of claim 1, wherein determining the one or more paragraphs comprises determining the one or more paragraphs at which a cursor is positioned.

5. The method of claim 1, wherein a type of the motion input includes a motion of the electronic device.

6. An electronic device, comprising;
    a display configured to:
        display a text including one or more paragraphs;
        after displaying the text, detect a user touch input drawing a vertical indicator overlapping the text displayed on the display;
        display, in a region in which the user touch input is inputted, the vertical indicator overlapping the text displayed on the display; and
    a processor configured to:
        determine one or more paragraphs overlapped with at least part of the vertical indicator among the one or more paragraphs included in the text;
    a motion sensor configured to detect a motion input across the vertical indicator; and
    wherein the processor further configured to, in response to detecting the motion input across the vertical indicator, indent, by an indentation distance, the determined one or more paragraphs based on a position of the vertical indicator and an intensity of the motion input across the vertical indicator,
    wherein the indentation distance is a horizontal distance between a virtual vertical line representing left margin of the determined one or more paragraphs and the vertical indicator.

7. The electronic device of claim 6, wherein the motion sensor includes at least one of one or more cameras, a gesture sensor, a gyro sensor, a magnetic sensor, an accelerometer, a grip sensor, a proximity sensor, a bio sensor, a geomagnetic sensor, or an ultrasonic sensor.

8. The electronic device of claim 6, further comprising an input unit configured to detect an input of a user, wherein the processor is configured to display a vertical line shaped in a straight line according to input information detected through the input unit.

9. The electronic device of claim 6, further comprising an input unit configured to detect an input of a user, wherein the processor is configured to display a vertical line shaped in a straight line perpendicular to a direction of the text according to input information detected through the input unit.

10. The electronic device of claim 6, wherein the processor is configured to determine the one or more paragraphs at which a cursor is positioned.

11. The electronic device of claim 6, further comprising a memory including one or more programs to be executable by the processor.

* * * * *